US012126867B2

(12) United States Patent
Andries et al.

(10) Patent No.: US 12,126,867 B2
(45) Date of Patent: *Oct. 22, 2024

(54) SYSTEMS AND METHODS FOR AGGREGATING CONTENT IDENTIFIERS IN A SUPER-INTERFACE

(71) Applicant: ADEIA GUIDES INC., San Jose, CA (US)

(72) Inventors: Chase Andries, Cary, NC (US); Alec Custer, Durham, NC (US); Reda Harb, Tampa, FL (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/234,479

(22) Filed: Aug. 16, 2023

(65) Prior Publication Data

US 2023/0396843 A1 Dec. 7, 2023

Related U.S. Application Data

(63) Continuation of application No. 17/899,228, filed on Aug. 30, 2022, now Pat. No. 11,765,431, which is a continuation of application No. 16/950,856, filed on Nov. 17, 2020, now Pat. No. 11,463,771.

(51) Int. Cl.
*H04N 21/45* (2011.01)
*H04N 21/258* (2011.01)
*H04N 21/442* (2011.01)
*H04N 21/466* (2011.01)

(52) U.S. Cl.
CPC ... *H04N 21/4532* (2013.01); *H04N 21/25891* (2013.01); *H04N 21/44222* (2013.01); *H04N 21/4668* (2013.01)

(58) Field of Classification Search
CPC ......... H04N 21/4532; H04N 21/25891; H04N 21/44222; H04N 21/4668
See application file for complete search history.

(56) References Cited

U.S. PATENT DOCUMENTS

| 6,756,997 | B1 | 6/2004 | Ward et al. |
| 8,578,419 | B2 | 11/2013 | Bayrakeri et al. |
| 9,100,709 | B1 | 8/2015 | Osminer et al. |
| 9,172,768 | B2 | 10/2015 | Stefanik et al. |

(Continued)

*Primary Examiner* — Nnenna N Ekpo
(74) *Attorney, Agent, or Firm* — HALEY GUILIANO LLP

(57) ABSTRACT

Systems and methods are described for generating a super-interface that aggregates content identifiers from different content sources. A super-interface is generated for display. The super-interface comprises a first interface that comprises a first plurality of content items available from a first content source and a second interface that comprises a second plurality of content items available from a second content source. The second content source is different from the first content source. The first interface and the second interface are simultaneously accessible to a first device. A user preference is detected based on a user interaction with the first interface. The second interface is automatically updated to comprise identifiers of a third plurality of content items that are available from the second content source. The third plurality of content items is selected based on the detected user preference from the user interaction with the first interface.

20 Claims, 19 Drawing Sheets

(56) References Cited

U.S. PATENT DOCUMENTS

| | | |
|---|---|---|
| 10,200,761 B1 | 2/2019 | Christie et al. |
| 10,439,831 B1 | 10/2019 | Governale et al. |
| 10,671,253 B2 | 6/2020 | Einaudi |
| 2001/0012024 A1 | 8/2001 | Rosin et al. |
| 2002/0069265 A1 | 6/2002 | Bountour et al. |
| 2006/0259926 A1 | 11/2006 | Scheelke et al. |
| 2011/0179453 A1 | 7/2011 | Poniatowski |
| 2012/0151529 A1 | 6/2012 | Andersson |
| 2012/0216228 A1 | 8/2012 | Padi et al. |
| 2012/0260291 A1* | 10/2012 | Wood .................. H04N 21/482 725/45 |
| 2013/0019266 A1 | 1/2013 | Doyle |
| 2013/0272679 A1 | 10/2013 | Cavalcanti |
| 2014/0006951 A1 | 1/2014 | Hunter |
| 2014/0184470 A1 | 7/2014 | Anderson et al. |
| 2014/0282729 A1 | 9/2014 | Stern et al. |
| 2016/0165307 A1 | 6/2016 | Lavender et al. |
| 2016/0179801 A1 | 6/2016 | Venkataraman et al. |
| 2017/0280196 A1 | 9/2017 | Thomas et al. |
| 2019/0149987 A1 | 5/2019 | Moore |
| 2019/0349619 A1 | 11/2019 | Hou |
| 2021/0006866 A1 | 1/2021 | Chu |
| 2021/0204032 A1 | 7/2021 | Vansickel et al. |
| 2022/0159343 A1 | 5/2022 | Andries et al. |
| 2022/0159345 A1 | 5/2022 | Andries et al. |
| 2022/0417599 A1 | 12/2022 | Andries et al. |

\* cited by examiner

SYSTEMS AND METHODS FOR AGGREGATING CONTENT IDENTIFIERS IN A SUPER-INTERFACE

CROSS-REFERENCE TO RELATED APPLICATIONS

This application is a continuation of U.S. patent application Ser. No. 17/899,228, filed Aug. 30, 2022, which is a continuation of U.S. patent application Ser. No. 16/950,856, filed Nov. 17, 2020, now U.S. Pat. No. 11,463,771, which are hereby incorporated by reference herein in their entireties.

BACKGROUND

The present disclosure relates to an improved user interface. In particular, systems and methods are disclosed for aggregating content identifiers from different content sources in a super-interface application.

SUMMARY

Users have many options for content accessible via various content sources. For example, users may stream content utilizing a user device from multiple content sources (e.g., content providers such as Netflix, Amazon Prime, etc.). However, users usually require an application tied to the content source (e.g., the Netflix app) to access the content. When a user wants to consume content from different content sources with a user device, the user device may need to execute a different application for each content source. A user may be required to exit an application to launch another application on the user device (e.g., to check what content may be available from a different content provider). To browse content identifiers from different content sources, users would need to switch between applications and provide additional user input on the user device (e.g., logging into a separate account, closing and opening applications, performing a search query in each application, etc.). This may waste resources because multiple user accounts need to be individually configured. With a plethora of content available for user consumption from the various content sources, having multiple applications for each content source may be time-consuming, confusing, and frustrating for users by having to switch applications and can ruin a user's entertainment experience.

Worse, browsing in a first application may not affect an interface of a second application. Each application may have a corresponding interface that lacks connectivity with interfaces of other applications. For example, a first application may store browsing history and/or user activity in a user profile for a user device. When the user device switches to a second application, the second application may not have access to any information from the first application due to the lack of connectivity between applications. Consequently, the second application may lack, e.g., real-time updates based on the user device executing instructions to browse content identifiers in the first application. In one approach, a general user profile, accessible to different applications, may store the browsing history and user activity so that different applications may access, e.g., the browsing history. However, a general user profile cannot be used to update content identifiers in a second application while browsing content identifiers in a first application at a user device, e.g., because the user device would need to continuously run the second application (potentially wasting device memory and processor cycles to keep multiple applications active). A general user profile also cannot assist with real-time updates while browsing content identifiers from multiple content sources because of the lack of connectivity between applications tied to the content sources.

In addition, an application interface tied to a content source may not have as much customization that a user might prefer. Such an application interface is usually defined by a service provider associated with the content source and a user device may be restricted from making changes to the application interface (e.g., adjusting display size for a section or choosing what types of content identifiers should be displayed). For example, the application interface may be displayed on a small screen with limited space (e.g., on a mobile device). Due to the variety of displays available to users, an interface defined by a content source may not be able to adapt sufficiently for an individual user's display device. A user device may display irrelevant content identifiers because the application interface may restrict the user device from selecting what content identifiers should be displayed. For example, a section of the application interface may be restricted to display advertisements or additional content genres (e.g., horror) that a user may not prefer. Users may find such an application interface too restrictive. Additionally, there is no mechanism to share customized interfaces for multiple sources between users.

To overcome these problems, systems and methods are provided herein for a customizable and sharable super-interface application that aggregates content identifiers from multiple content sources and allows for updates to occur to interfaces for accessing other content sources as a user is actively browsing an interface for accessing one of the multiple content sources. Instead of several different applications that may be tied to content sources, users may be provided with a super-interface that comprises multiple simultaneously accessible interfaces for browsing and consuming content.

In some embodiments, the super-interface application generates for display a super-interface. The super-interface may comprise a first interface that comprises identifiers corresponding to a first plurality of content items available from a first content source and a second interface that comprises identifiers corresponding to a second plurality of content items available from a second content source. A content identifier may include but is not limited to textual data (e.g., a title), image data (e.g., a picture or poster), or a combination thereof. The first and second interfaces may be simultaneously accessible to a first device (e.g., displayed on the screen or accessible via a single click, for example using multiple tabs). For example, a first interface may comprise content identifiers from a first content provider (e.g., Netflix) and a second interface may comprise content identifiers from a second content provider (e.g., Amazon Prime). The super-interface application may enable a user device to access the content selection interfaces for the first and second content providers simultaneously. In another non-limiting example, the second interface may comprise content from a content database (e.g., the Internet Movie Database or IMDB). In some aspects, the super-interface application may update the second interface based on user's interaction with the first interface (e.g., to comprise related content identifiers to content identifiers displayed in the first interface).

In some embodiments, the super-interface application may monitor user interactions with the super-interface. The super-interface application may detect a user preference based on a user interaction with a first interface. The super-interface application may update a second interface to comprise identifiers of a third plurality of content items that are available from a second content source. In some embodiments, the super-interface application may select the third plurality of content items based on the detected user preference from the user interaction with the first interface. For example, a user interface of a user device may be used to scroll through a first content category comprising a genre (e.g., Netflix's "popular"). In this example, the super-interface application may determine that a user at the user device prefers the first content category based on the scrolling (e.g., the "popular" category). The super-interface application may automatically update the second interface to comprise content associated with the first content category that is available from a second content source (e.g., Amazon Prime's "Popular Movies"). For example, the super-interface application may update the second interface in real-time to include the identifiers of the third plurality of content items as the user interacts with the first interface. In some embodiments, the super-interface application may immediately update the second interface upon detecting the user preference (e.g., when the user browses through a category instead of switching categories).

A user device may execute interactions with an interface on the user device in various ways (e.g., browsing, zooming in a display, rotating, tapping, etc.) and not all the interactions may indicate a user preference. In some embodiments, the super-interface application may determine whether a user interaction indicates a user preference. The super-interface application may update the second interface in response to determining that the user interaction indicates a user preference. For example, a user interaction at a user device may enlarge a display for improved viewing of content identifiers in a first interface (e.g., pinching a touch-sensitive screen). In this example, the super-interface application may determine that enlarging the display does not indicate a particular interest in a content item. In another non-limiting example, a user interaction at a user device may enlarge display of a content identifier for a particular content item in a first interface. In this example, the super-interface application may determine that enlarging display of the content identifier indicates a user preference for the particular content item. The super-interface may then determine to update the second interface based on the user preference for the particular content item (e.g., preference of a genre of the particular content item).

Such techniques may enable a user device to browse content identifiers from the multiple content providers at the same time without switching between multiple applications. In some aspects, the super-interface application enables a user device to browse relevant content identifiers from multiple content sources simultaneously. Interacting with a super-interface application may reduce the amount of user input (e.g., a single search query for content identifiers from multiple content providers instead of separate search queries for each content provider). In some aspects, a super-interface may enable connectivity between the multiple interfaces. For example, a user device may execute instructions to select content identifiers and/or browse a genre in a first interface. The super-interface application may update a second interface to comprise content identifiers based on the user device executing an interaction with the first interface. A super-interface application may be less time-consuming, less confusing, and less frustrating for a user, leading to an enhanced entertainment experience. In addition, the super-interface application may prevent a waste of user interface space and system resources by generating for display content identifiers that are unlikely to be selected by the users. For example, the super-interface application may refrain from providing irrelevant content identifiers to users. Instead, the super-interface application may provide content identifiers that may be relevant for present consumption by updating an interface of the super-interface based on user interactions with another interface.

Further, in some embodiments, the super-interface application may define a super-interface (e.g., based on interactions via a user device). Defining the super-interface may comprise selecting a first content source and a second content source. For example, the first content source may be selected to be assigned to a first interface and the second content source may be selected to be assigned to a second interface. Defining the super-interface may comprise selecting a first display configuration for a first interface and a second display configuration for a second interface. For example, the super-interface application may define a spatial relationship between interfaces in the super-interface. For example, the super-interface application may define proportions for portions within an interface or portions between interfaces in the super-interface. For example, a display configuration may be a template. For example, a display configuration may be in various shapes (e.g., rectangle, ellipse, polygon, helix, etc.). In some embodiments, the super-interface application may receive a selection of the super-interface at a first device. In response, the super-interface application generates for display, at the first device, the first interface in the first display configuration and the second interface. The super-interface application may generate the first interface to comprise identifiers of a first plurality of content items available from the first content source. The super-interface application may generate the second interface to comprise identifiers of a second plurality of content items available from the second content source. The first and second interfaces may be simultaneously accessible to the first device.

In some embodiments, a super-interface application may provide a defined (e.g., previously configured) super-interface (e.g., to one or more user devices). In some embodiments, the super-interface application may receive, from a first device, a request to provide the super-interface to a second device. For example, the super-interface application, based on a first user device altering a super-interface, may have defined a super-interface to comprise a first interface in a first display configuration and a second interface in a second display configuration (e.g., in certain spatial relation to each other and in certain proportions). A user device may transmit a request to share the super-interface with a second user device. In some embodiments, the super-interface application, in response to receiving the request, may provide, to the second device, the super-interface. For example, the super-interface application may provide the super-interface to a second user device. In some embodiments, the super-interface application may determine altering of a display configuration for an interface on the second device. For example, the second user device may execute a process to resize an interface and/or rotate display of an interface in the super-interface. The second user device may execute instructions to alter the super-interface (e.g., alter the first display configuration of the first interface). In some embodiments, the super-interface application may generate a display configuration based on the altering. In some embodiments, the super-interface application may generate a third display configuration based on altering, at a second device, a first display configuration for a first interface of the super-interface. In some embodiments, the super-interface application may generate for display, at the second device, a first interface in the third display configuration.

Such techniques may enable a user device to define and customize any of multiple interfaces in the super-interface rather than be restricted to an application interface tied to a content source. In some aspects, the super-interface application can define and customize a super-interface suited for the needs of a particular user or user device. For example, the super-interface application may have generated a display configuration comprising a display size customized for a display with limited space. In some aspects, the super-interface application allows a user to define a single super-interface for a user device rather than a user expending effort in configuring multiple application interfaces of applications tied to content sources. Additionally, the super-interface application may share the super-interface with other user devices, allowing other users to access and customize the super-interface, if desired. In some embodiments, the super-interface application may store a super-interface database (e.g., a super-interface library) that contains super-interfaces from users or designed for various user devices. In some aspects, such a super-interface database may allow users to select a preferred super-interface. In some aspects, the super-interface application may enable a user device to select content identifiers to be displayed. For example, a user device may indicate a user preference for a first interface of the super-interface application that displays content identifiers from a first content source and for a second interface that displays content identifiers from a second content source. In addition, the super-interface application may update the interfaces to comprise related content identifiers and/or preferred content identifiers. A super-interface application that can be user-customized may further enhance a user's entertainment experience.

It should be noted, the systems and/or methods described above may be applied to, or used in accordance with, other systems, methods and/or apparatuses.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods are described herein for a super-interface application that aggregates content identifiers from different content sources in a super-interface.

As referred to herein, the term "content" should be understood to mean an electronically consumable asset accessed using any suitable electronic platform, such as broadcast television programming, pay-per-view programs, on-demand programs (as in video-on-demand (VOD) systems), Internet content (e.g., streaming content, downloadable content, Webcasts, etc.), video clips, audio, information about content, images, animations, documents, playlists, websites and webpages, articles, books, electronic books, blogs, chat sessions, social media, software applications, games, virtual reality media, augmented reality media, and/or any other media or multimedia and/or any combination thereof.

Figure 1A:
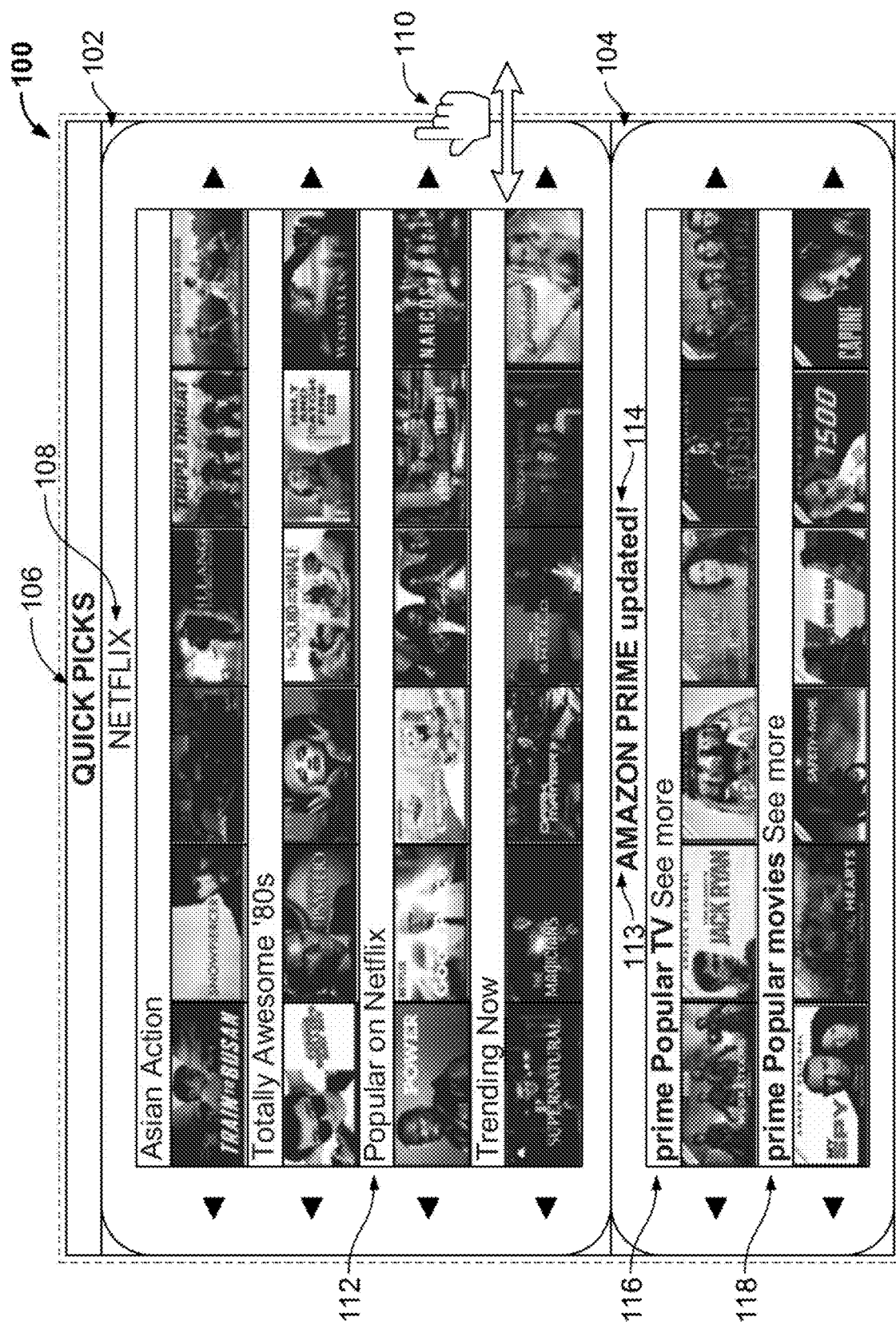
FIGS. 1A-1B (collectively referred to as FIG. 1) show illustrative diagrams for a super-interface, in accordance with some embodiments of the disclosure.

FIG. 1 shows illustrative diagrams for a super-interface, in accordance with some embodiments of the disclosure. FIG. 1A shows super-interface 100 comprising first interface 102 and second interface 104. In some embodiments, the super-interface application may generate super-interface 100 for display on a user device. Super-interface 100 may optionally include identifier 106 (e.g., a title such as "Quick Picks"). Interface 102 is configured to display identifiers of a first plurality of content items available from first content source corresponding to identifier 108 (e.g., "Netflix"). Interface 104 is configured to display identifiers of a second plurality of content items available from second content source 113 (e.g., "Amazon Prime"). The first and second pluralities of content identifiers include content categories (e.g., content category 112). In some embodiments, the first interface and second interface are simultaneously accessible. In some embodiments, the interfaces of the super-interface may be displayed simultaneously. For example, the super-interface application may cause to be displayed the first interface and second interface so that a user device is capable of executing instructions to browse content identifiers from the first content source and the second content source at the same time. For example, interfaces 102-104 may be displayed at the same time on a user device.

In some embodiments, the super-interface application may monitor the super-interface for user interactions. A user device may execute interactions with super-interface 100 such as interaction 110. For example, interaction 110 may include swiping a screen, tapping an arrow option for scrolling, etc. For example, a user device may execute instructions to switch content categories by scrolling vertically in interface 102. Super-interface 100 may be configured to provide additional content categories within an interface based on the vertical scrolling. For example, if a first content category (e.g., "Asian Action") is moved off-screen of interface 102, the super-interface application may add another content category (e.g., "Comedy") at the opposite side of the interface 102 that replaces the first content category (e.g., "Asian Action"). For example, at Table 1 below, a user may scroll up a category row of content identifiers and shift the row for "Asian Action" off screen. The super-interface application may add another category row of identifiers for "Thriller" as depicted at Table 2.

TABLE 1

| Asian Action |
| Popular |
| Comedy |

TABLE 2

| Popular |
| Comedy |
| Thriller |

For example, a user device may execute instructions to scroll in interface 102 in order to browse within content category 112 (e.g., "Popular") on the user device. In one example, the super-interface application may determine that switching content categories does not indicate a user preference and will not update the second interface based on the switching of content categories. The super-interface detects interaction 110 that results in browsing within content category 112. For example, the super-interface application may shift the content identifiers within content category 112 to the right based on interaction 110. Super-interface 100 may be configured to include additional content identifiers associated with the content category based on interaction 110. For example, a content identifier (e.g., "Narcos") may be shifted off-screen to the right. The super-interface application may provide another content identifier (e.g., "The 100") on the left side of the screen, opposite to the shift. For example, at Table 3 below, a user may scroll right within a category row of content identifiers and shift "Narcos" off screen. The super-interface application may add an identifier for "The 100" as depicted at Table 4.

TABLE 3

| Power | Good Place | Spongebob | Pretty Little Liars | Big Bang Theory | Narcos |

TABLE 4

| The 100 | Power | Good Place | Spongebob | Pretty Little Liars | Big Bang Theory |

The super-interface application may detect a user preference based on the user interaction. For example, the super-interface application may detect, based on interaction 110, that the user device indicates preference for content associated with content category 112. For example, the super-interface application may determine that interaction 110 indicates a focus on content category 112 and does not indicate browsing through categories. The super-interface application automatically updates second interface 104 to comprise identifiers of a third plurality of content items available from second content source 113. For example, a user, via a user device, may browse content category 112 (e.g., "Popular") via horizontal scrolling as indicated by interaction 110. In one example, the super-interface application may determine that interface 104 is not displaying a content category related to content category 112. The super-interface application may update interface 104 to include content categories that are the same or are related to content category 112. For example, the super-interface application may update interface 104 to include content category 116 (e.g., "Popular TV") and content category 118 (e.g., "Popular movies"). The super-interface application may access a database of related content categories to search related content categories based on content category 112. For example, the super-interface application may search the database based on a keyword (e.g., "popular") in content category 112. For example, the super-interface application may search the database based on a category including some of the same content items as content category 112. In some embodiments, the super-interface application may generate a notification and/or indicator in the super-interface that is associated with the updated interface. For example, the super-interface application may generate an icon in the super-interface to indicate that content identifiers in the second interface was updated. For example, the super-interface application may update second interface 104 to comprise an indicator 114 of the update (e.g., a text indicator "updated!"). The super-interface application may select identifiers from the third plurality of content items based on the detected user preference. For example, the super-interface application may select content categories 116 (e.g., "Popular TV") and 118 (e.g., "Popular movies") based on browsing of content category 112 (e.g., "popular").

Figure 1B:
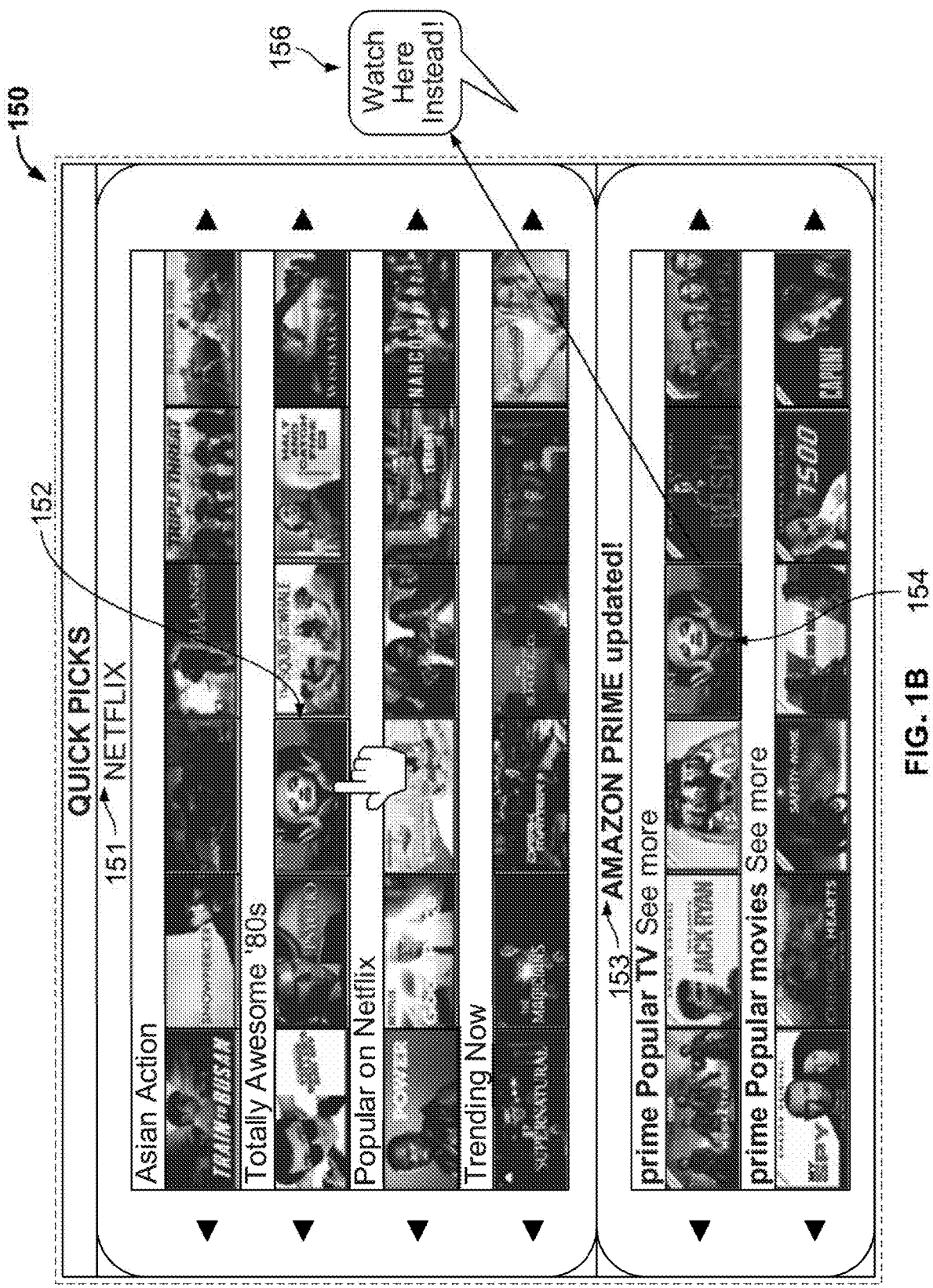

FIG. 1B shows super-interface 150. Super-interface 150 may be super-interface 100. In super-interface 150, a user device executes instructions to select a content identifier in the first interface on the user device (e.g., via interaction 152). For example, interaction 152 may include a tap on a content identifier or a cursor stopping at the content identifier for a certain period of time. The super-interface application may detect interaction 152 and determine a user preference for the selected content identifier based on interaction 152. For example, the super-interface interaction 152 may be a cursor hovering over a content identifier (e.g., "Pose"). The super-interface application may determine interaction 152 indicates a user preference for content associated with the content identifier based on the cursor hovering over the content identifier for a certain period of time. In some embodiments, the super-interface application may determine whether a first content item is available from the second content source. In some embodiments, the super-interface application may transmit a query to the second content source based on the first content item. For example, the super-interface application may transmit a query comprising an identifier for the first content item to the second content source. Based on the query, the super-interface application may determine a content item available from the second content source that includes an identifier matching the identifier of the selected content item. For example, the super-interface application may determine that a content item with content identifier 154 selected by interaction 152 is available from the second content source and includes an identifier that matches the content identifier selected by interaction 152.

In some embodiments, the super-interface application may determine that a content item in the first interface is available from the second content source. In some embodiments, the super-interface application, when updating the second interface, may determine that a second content item, comprising substantially similar content, or the same content, as the first content item, is available from the second content source. In some embodiments, the super-interface application determines that a second identifier of a second content item available from the second content source matches a first identifier of the first content item available from the first content source. For example, the super-interface application may detect selection of a content identifier of a first content item in the first interface. The super-interface application may query the second content source based on the content identifier of the first content item. The super-interface application may receive a second identifier of a second content item available from the second source and determine that the first identifier matches the second identifier. Based on comparing content metadata and identifiers, the super-interface application may determine that the second content item comprises substantially similar, or the same, content as the first content item. For example, a user device may execute instructions to select content identifier 152 (e.g., "Pose") from the first content source (e.g., "Netflix"). The super-interface application may find a matching content identifier from the second content source (e.g., "Amazon"). The super-interface application may compare metadata to determine that the content items from the first and second content sources are the same.

In some embodiments, the super-interface application may determine that the second content item from the second content source is preferred based on comparing attributes corresponding to the content sources and/or content items. For example, the super-interface application may determine that accessing the second content item from the second content source is less restricted than accessing the first content item from the first content source. For example, the super-interface application may determine that the second content item comprises fewer advertisements than the first content item. For example, the super-interface application may determine that the second content item is presented at a higher quality (e.g., high definition) than the first content item. In some embodiments, the super-interface application may determine that the second content item and/or second content source is preferred based on a user profile. For example, the super-interface application may access a user profile and determine that the second content item is preferred based on a user device executing instructions to browse the second content source more than the first content source.

In some embodiments, the super-interface application may, in response to determining the second content item is preferred, select the second identifier for the second content item to be included in identifiers for the third plurality of content items to be generated for display after updating the second interface. For example, a content identifier (e.g., "Pose") for the second content item may be selected in the first interface of super-interface 150. The super-interface application may display a content category (e.g., "Popular TV") associated with the second content item and may arrange the content identifiers to center the identifier for the second content item (e.g., "Pose") in the row for the content category (e.g., "Popular TV") as depicted in FIG. 1B. For example, the super-interface application may have included content identifier 154 in the second interface. In some embodiments, the super-interface application may generate and/or accentuate an indicator in the super-interface about the second content identifier in the second interface. For example, the super-interface application may generate notification 156 (e.g., with text "Watch Here Instead") along with an arrow pointing to content identifier 154 in the second interface. For example, notification 156 may indicate a reason to select the second content identifier. Some non-limiting examples for reasons include a lower access cost, availability of high-definition (HD) content, fewer commercials, etc. In some embodiments, the super-interface application generates a notification and/or indicator that includes an icon associated with the second content item being included in the second interface. For example, notification 156 may also include an iconic face of a well-known actress or another iconic image that is associated with content identifier 154.

In some embodiments, the super-interface application may continuously monitor user interactions in the super-interface to determine user preferences and dynamically update one or more interfaces in the super-interface based on the user preferences. For example, the super-interface application may update the first interface based on user interactions in the second interface if a user device executes user interactions in the second interface. In some embodiments, the super-interface application may provide an option to delay updating an interface. For example, after the super-interface application includes content identifier 154 in the second interface, a user device may execute instructions to compare content identifier 152 in the first interface and content identifier 154 in the second interface. The super-interface application may provide an option in the super-interface that delays updating of the first interface and the second interface. In some embodiments, the super-interface application may generate for display a third interface that comprises information about content items based on content identifiers in the first interface and information about content items in the second interface. The content items associated with content identifiers in the first interface may be related to the content items associated with content identifiers in the second interface. For example, the super-interface application may display a third interface that lists attributes related to the content sources and/or the content items.

A super-interface comprising two interfaces is depicted in FIG. 1 for purposes of illustration. It should be noted that a super-interface may comprise any number of interfaces. The number of interfaces may depend on user preferences. In addition, a user device is not limited to interactions with a first interface and may execute interactions with a second interface. The super-interface application may detect a user preference based on a user interaction with the second interface. The super-interface application may update the first interface as described above and below.

In some embodiments, the super-interface application may retrieve content identifiers from a content source. The super-interface application may search, select, and/or categorize the content identifiers for display in any interface of the super-interface. For example, the super-interface application may fetch content identifiers via an application programming interface (API) provided by a content source. For example, the super-interface application may search for content available from a content source based on a detected user preference using the content source API.

Figure 2:
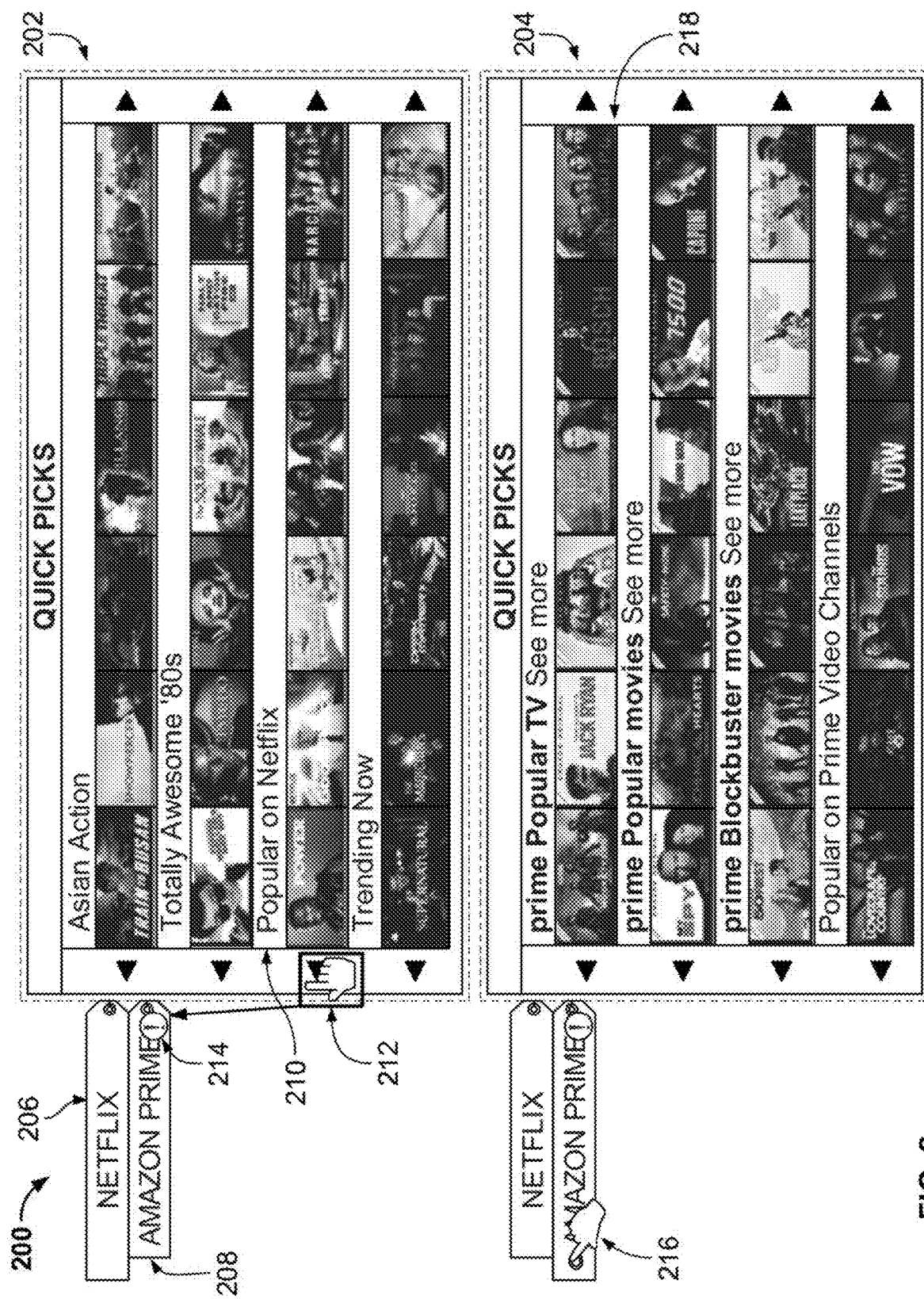
FIG. 2 shows an illustrative diagram of a super-interface, in accordance with some embodiments of the disclosure.

FIG. 2 shows an illustrative diagram of a super-interface, in accordance with some embodiments of the disclosure. Super-interface 200 comprises a first interface 202 and a second interface 204. In some embodiments, the super-interface application generates a super-interface comprising simultaneous access for multiple interfaces. For example, interfaces 202 and 204 may be simultaneously accessible to a user device. In some embodiments, the interfaces of the super-interface may be accessed via selecting a tab (e.g., with a single click or tap). Super-interface 200 includes selectable tabs 206 and 208. Interface 202 is configured to display identifiers of a first plurality of content items available from a first content source (e.g., "Netflix") corresponding to tab 206. Interface 204 is configured to display identifiers of a second plurality of content items available from a second content source (e.g., "Netflix") corresponding to tab 208. A user device may execute interactions with interface 202 to browse content available from the first content source. In super-interface 200, a user device may execute interaction 212 to scroll content category 210 (e.g., "Popular") in interface 202. The super-interface application automatically updates interface 204 based on interaction 212. Techniques as described in relation to FIGS. 1A-1B may be applied by the super-interface application in updating the interfaces accessed by the tabs. For example, the super-interface application may update interface 204 inside tab 208. In some embodiments, the super-interface application, when updating the second interface, may generate an indicator in the super-interface. For example, in super-interface 200, the super-interface application generates icon 214 in tab 208 to indicate that interface 204 is updated.

The super-interface application may cause display of an interface comprising identifiers of a plurality of content items via a selectable tab. For example, a user device may execute interaction 216 to select tab 208 in order to browse content identifiers in interface 204 on the user device. In response to selecting tab 208, the super-interface application causes interface 216 to be displayed on the user device including the identifiers of a third plurality of content items available from the second content source. The super-interface application selects the third plurality of content items based on interaction 212. For example, the super-interface application may have selected content identifiers associated with content category 218 because the user browsed content category 210.

A super-interface comprising two interfaces that are accessible via tabs is depicted in FIG. 2 for purposes of illustration. It should be noted that a super-interface may comprise any number of interfaces that are accessible via tabs. The number of interfaces may depend on user preferences or what subscriptions the user has.

Figure 3:
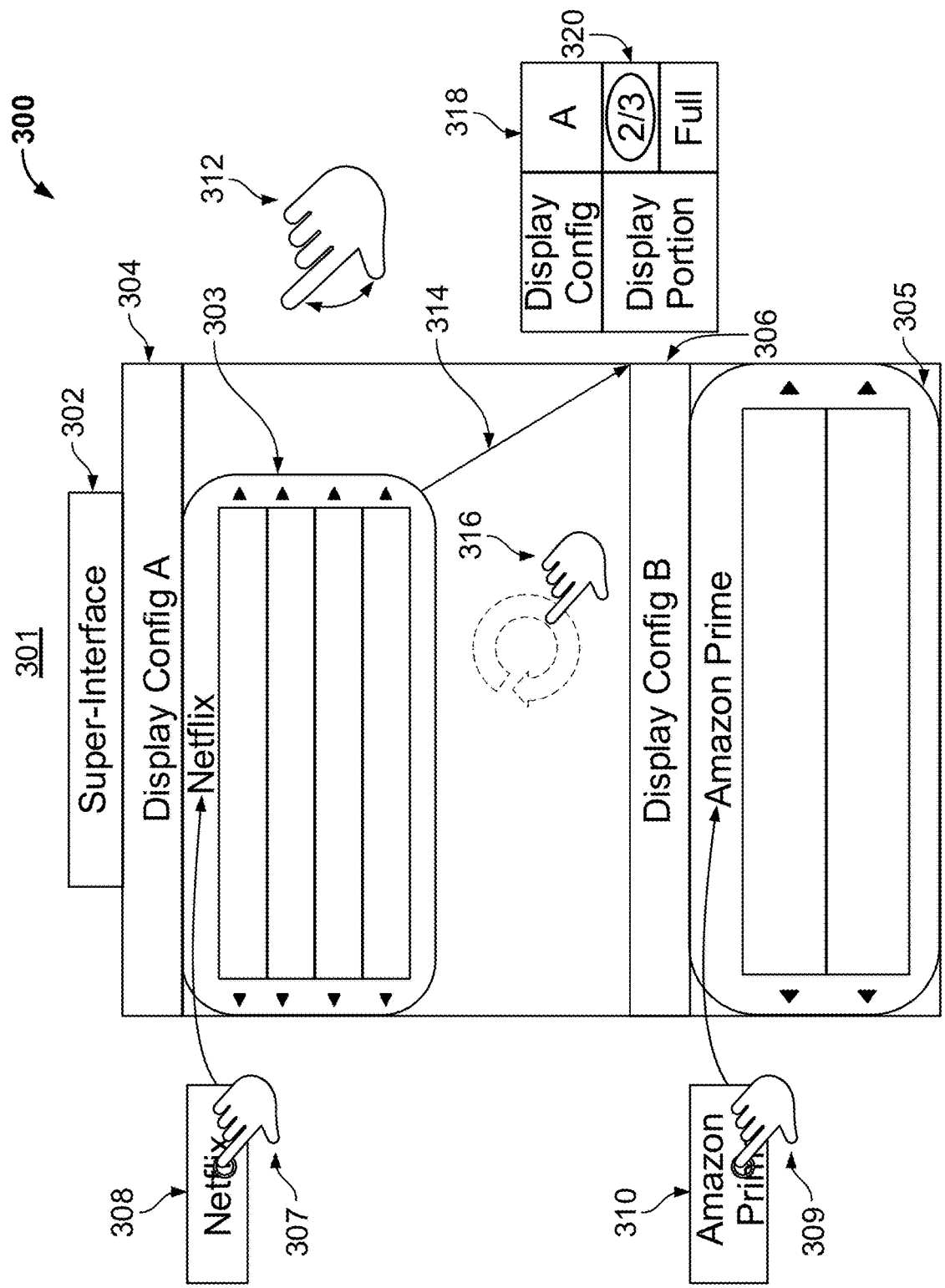
FIG. 3 shows a diagram of an illustrative system for defining a super-interface, in accordance with some embodiments of the disclosure.

FIG. 3 shows a diagram of an illustrative system for defining a super-interface, in accordance with some embodiments of the disclosure. In some embodiments, the super-interface application may allow definition of a super-interface (e.g., for accessing via a user device). At system 300, the super-interface application, based on various user interactions (e.g., interactions 307, 309, 312, and 316) at a first user device, defines a super-interface 301. Super-interface 301 may include an identifier 302 (e.g., "Super Interface"). Super-interface 301 comprises first interface template area 303 in first display configuration 304 and second interface template area 305 in second display configuration 306. The super-interface application, when defining super-interface 301, selects content source 308 (e.g., based on interaction 307). For example, a user may drag content source 308 (e.g., "Netflix") into interface template area 303 and the super-interface application configures interface template area 303 to display content identifiers from content source 308. Content source 308 is assigned to interface template area 303. The super-interface application, when defining super-interface 301, selects content source 310 (e.g., based on interaction 309). Content source 310 is assigned to interface template area 305. The super-interface application selects display configuration 304 for interface template area 303. For example, the super-interface application may have configured interface 102 based on display configuration 304. In some embodiments, the super-interface application may connect selected interfaces in a super-interface via the updating based on a detected user preference as described above and below. In some embodiments, the super-interface application receives an instruction (e.g., from a user device) to select a first interface and a second interface for connecting via the updating as described above and below. For example, the super-interface application may receive a selection from a user device that chooses which interface template areas in super-interface 300 should be linked and which interface template areas should not be linked.

In some embodiments, the super-interface application may provide various options for altering a display configuration. For example, the super-interface application may select a display configuration corresponding to simultaneous display of interfaces as depicted in FIG. 1. For example, the super-interface application may select a display configuration corresponding to interfaces accessible via selectable tabs as depicted in FIG. 2. In some embodiments, the super-interface application may alter a display size for a first display configuration (e.g., at a first device). For example, a user device may execute instructions to alter various attributes of display configuration 304 for interface template area 303. For example, a user may pinch a touch-sensitive screen on a user device, and in response, the super-interface application may cause a change to display size for a display configuration. For example, the super-interface application may change display proportions or other relative settings between interface template area 303 and interface template area 305. In super-interface 301, the super-interface application detects interaction 312. Interaction 312 may be a gesture that causes the user device to alter a display size. For example, interaction 312 may include a pinch, a two-finger tap, a hold and drag of a cursor, etc. The super-interface application, based on interaction 312, alters display configuration, for example, by increasing display size (depicted by arrow 314) of interface template area 303. In some embodiments, the super-interface application may alter a display ratio for a first display configuration (e.g., at a first device). For example, in super-interface 301, the super-interface application may provide options 318 for display configuration 304 at a first user device. The first user device may execute instructions to select display ratio 320. The super-interface application may alter display configuration 304 of interface template area 303 based on display ratio 320 (e.g., as depicted by arrow 314). Altering a display ratio may comprise setting a relative display size in a first display configuration. For example, display ratio 320 may refer to a display size relative to the display size of super-interface 301. For example, display ratio 320 may refer to a display size relative to the display size of display configuration 306. The super-interface application may set the relative display size based on selecting options at the first user device. In some embodiments, the super-interface application may alter a display orientation for a first display configuration (e.g., at a first device). In super-interface 301, a user device may execute interaction 316 to rotate interface template area 303. The super-interface application, based on interaction 316, may alter a display orientation of display configuration 304. It should be noted that such techniques for altering a display configuration may apply to any number of display configuration for any number of interfaces (e.g., display configuration 306 for interface template area 305).

Figure 4:
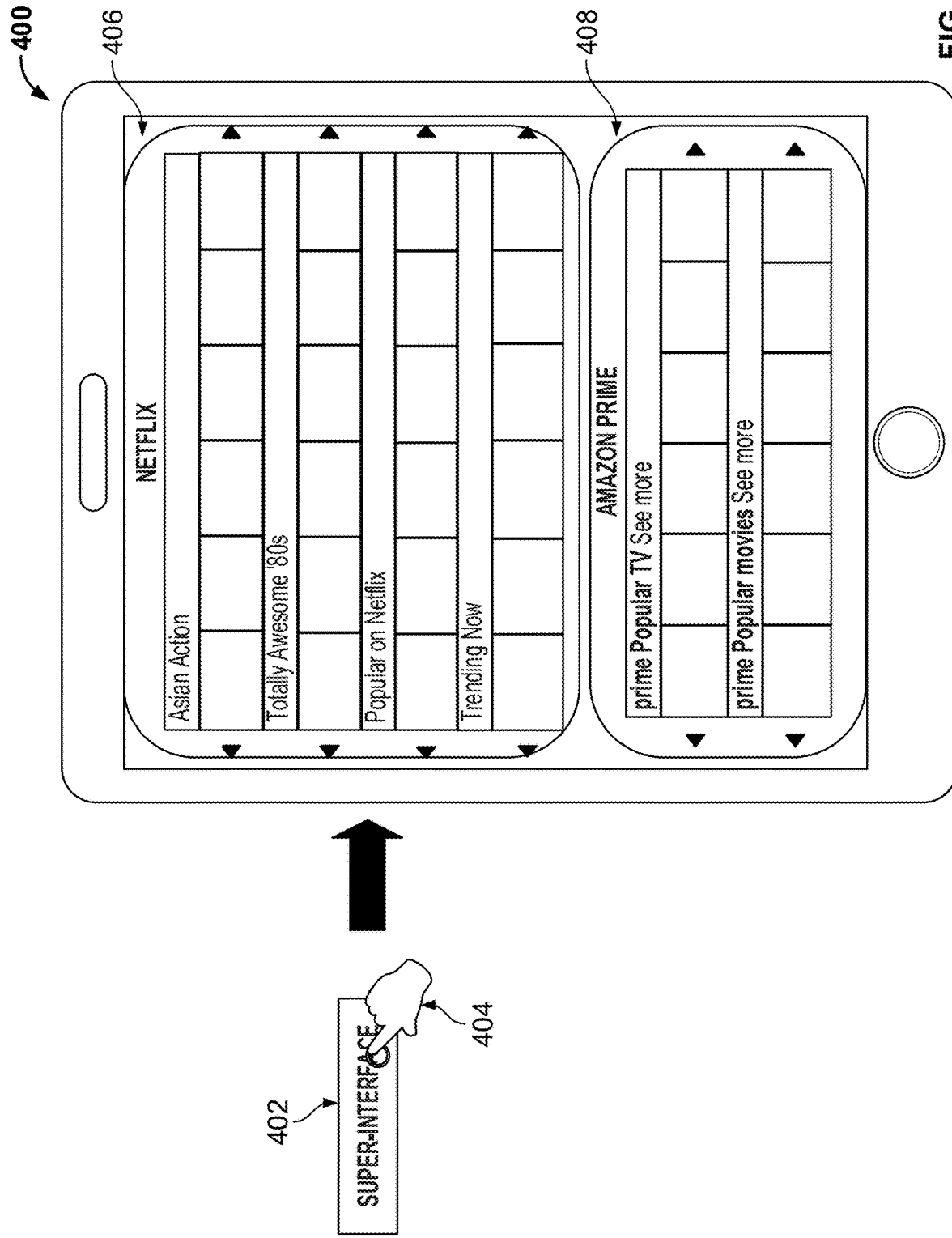
FIG. 4 shows an illustrative diagram of a super-interface selected on a first user device, in accordance with some embodiments of the disclosure.

FIG. 4 shows an illustrative diagram of a super-interface selected on a first user device, in accordance with some embodiments of the disclosure. In some embodiments, the super-interface application selects the super-interface at a first device. For example, a user device may execute instructions to select an identifier of a super-interface at a user device. The super-interface application may select the super-interface based on the identifier. FIG. 4 shows a device 400 displaying a super-interface comprising two interfaces. An identifier 402 for a super-interface (e.g., super-interface 301) may have been selected on device 400. The super-interface application receives selection 404 of identifier 402 (e.g., from a first user device). The super-interface application, in response to selection 404, generates for display at device 400 a first interface 406 and a second interface 408. At device 400, interfaces 406 and 408 are displayed simultaneously. Interface 406 is configured to comprise identifiers of a first plurality of content items available from a first content source (e.g., content source 308). Interface 408 is configured to comprise identifiers of a second plurality of content items available from a second content source (e.g., content source 310). Interface 406 and 408 are simultaneously accessible on device 400. Interface 406 is configured to be displayed in a first display configuration (e.g., display configuration 304). Interface 408 is configured to be displayed in a second display configuration (e.g., display configuration 306). In device 400, display of interfaces 406 and 408 includes any altering of the first and second display configurations (e.g., display configurations 304 and 306).

In some embodiments, the super-interface application may select a display configuration based on a display template. In some embodiments, the super-interface application may select, as a first display configuration, a first display configuration template of a plurality of display configuration templates. The super-interface application may define a super-interface based on the first display configuration template. For example, the super-interface application may provide a plurality of display configuration templates at a user device. The super-interface application may receive selection of a display configuration template. For example, the super-interface application may provide various empty shapes (e.g., rectangles, ellipses, etc.) as part of a display configuration template for an interface template area or for portions within an interface template area. The super-interface application may select a display configuration (e.g., display configuration 304) based on the display configuration template. The super-interface application may provide an interface of the super-interface in a default display configuration based on a display configuration template. A user device may execute instructions to customize the super-interface based on altering display configurations.

Such techniques may enable customization of a super-interface based on user preference. In some aspects, the super-interface application may enable a user device to execute instructions that define and customize any of multiple interfaces in a super-interface. In some aspects, the super-interface application may enable a user device to execute instructions that define a super-interface customized for, e.g., hardware limitations of the user device.

Figure 5:
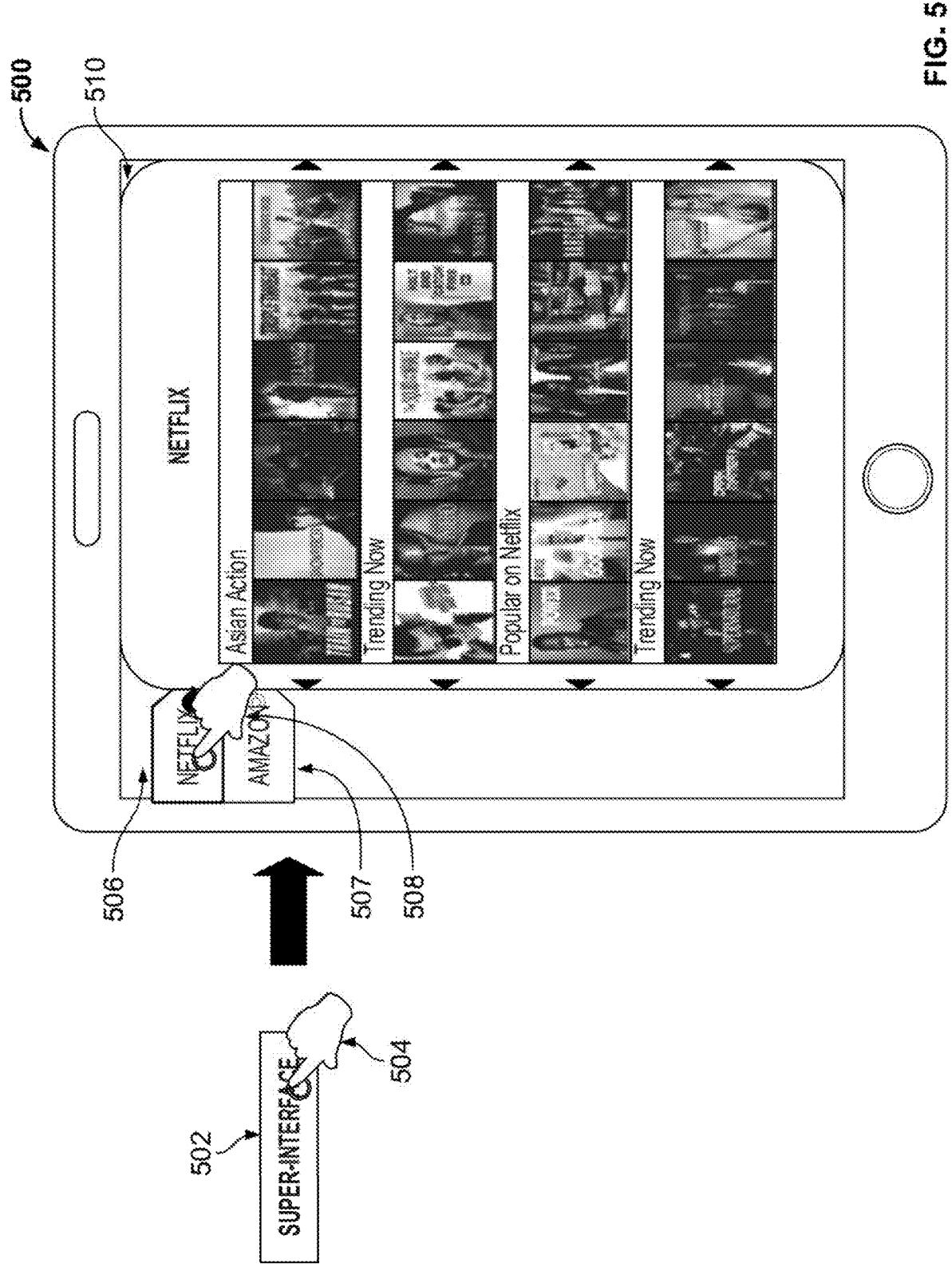
FIG. 5 shows an illustrative diagram of a super-interface selected on a user device, in accordance with some embodiments of the disclosure.

FIG. 5 shows an illustrative diagram of a super-interface selected on a user device, in accordance with some embodiments of the disclosure. In some embodiments, interfaces in a super-interface may be accessible via selectable tabs. For example, a user device may execute an instruction to select a tab in a super-interface and the super-interface application may cause to be displayed the interface corresponding to the selected tab. For example, a user device may configure a selectable tab to display an interface of the super-interface. FIG. 5 shows a device 500 displaying a super-interface comprising two interfaces that are accessible via selectable tabs. An identifier 502 for a super-interface may have been selected on device 500. The super-interface application receives selection 504 of identifier 502. The super-interface application, in response to selection 504, generates for display at device 500 a first interface 510 comprising identifiers of content available from a first content source, tab 506, and tab 508. At device 500, interface 510 is accessible via selecting tab 506 and a second interface (not shown) is accessible via selecting tab 507. Interface 510 is configured to comprise identifiers of a first plurality of content items available from a first content source (e.g., as identified in tab 506). The second interface is configured to comprise identifiers of a second plurality of content items available from a second content source (e.g., as identified in tab 507). Interface 510 is configured to be displayed in a first display configuration. A second interface is configured to be displayed in a second display configuration. A user, via interaction 508 at device 500, selects tab 506. The super-interface application causes to be displayed interface 510 comprising the identifiers of content available from the first content source, wherein interface 510 is displayed in the first display configuration.

Figure 6:
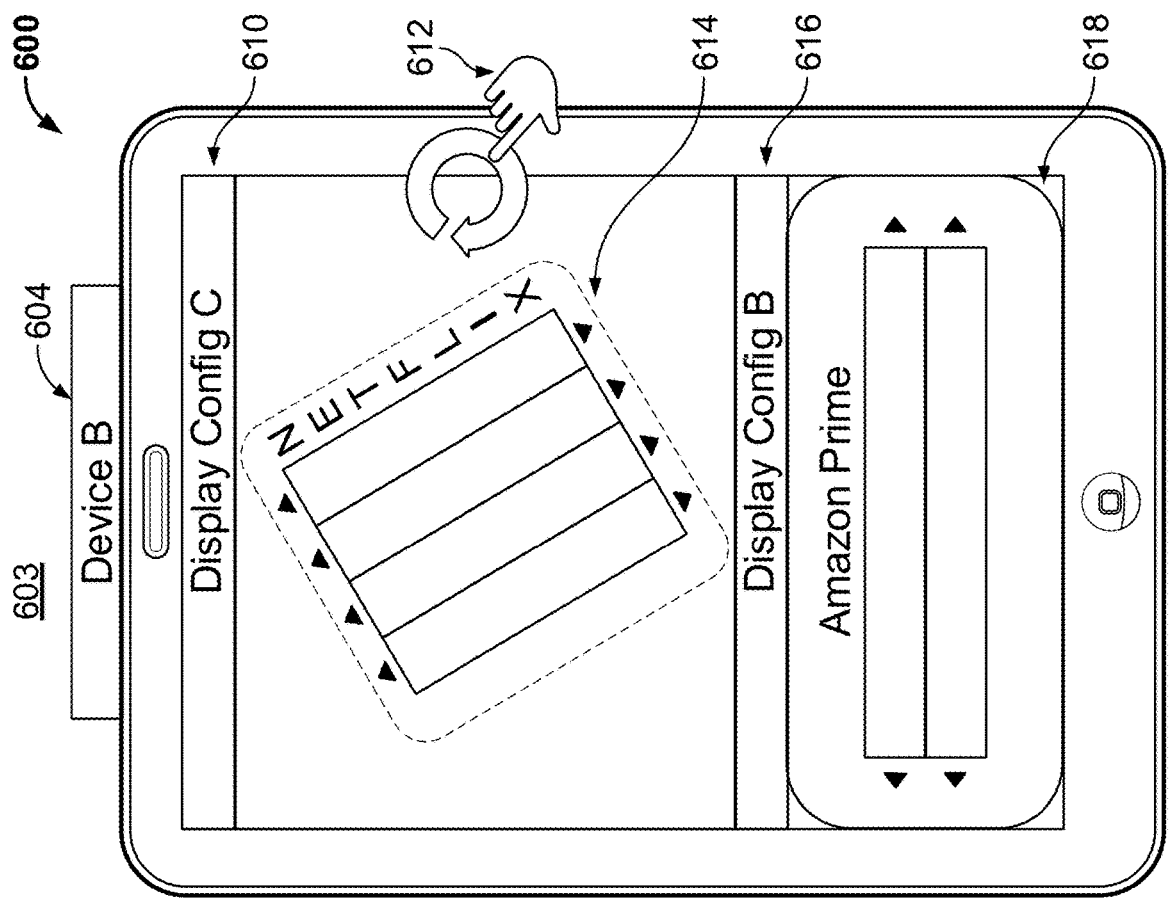
FIG. 6 shows a diagram of an illustrative system for providing a super-interface to a second user device and altering the super-interface on the second user device, in accordance with some embodiments of the disclosure.
Figure 6:
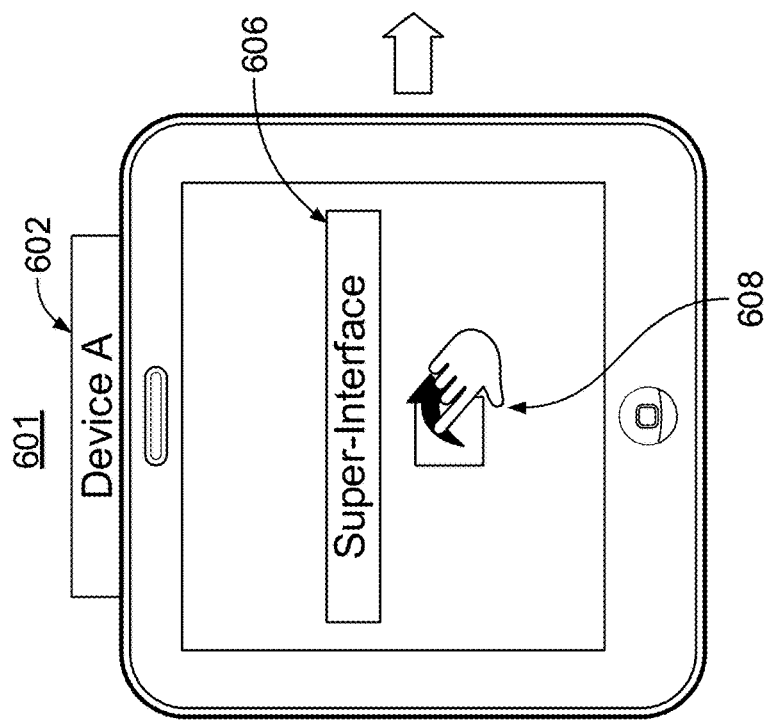

FIG. 6 shows a diagram of an illustrative system for providing a super-interface to a second user device and altering the super-interface on the second user device, in accordance with some embodiments of the disclosure. In some embodiments, the super-interface application may receive, from a first device, a request to provide the super-interface to a second device. In response, the super-interface application may provide the super-interface to the second device. FIG. 6 shows a system 600 including device 601 and device 603. Device 601 may include a device identifier 602 (e.g., "DEVICE A"). Device 603 may include a device identifier 604 (e.g., "DEVICE B"). At device 601, a user, at device 601, interacts with device 601 in order to provide a super-interface to device 603. The super-interface corresponds to super-interface identifier 606 (super-interface 606 hereinafter). For example, device 601 may execute an interaction with an option 608 for sharing super-interface 606 to device 603. In response, the super-interface application causes to be provided super-interface 606 to device 603. Device 603 may execute instructions to configure an interface in a different display configuration. Device 603 executes instructions to alter a first interface of super-interface 606. For example, device 603 executes interaction 612 that may rotate interface 614. Based on the altering at device 603, the super-interface application generates display configuration 610. The super-interface generates for display interface 618 in display configuration 616 at device 603.

In some embodiments, the super-interface application may alter a super-interface based on altering at a second user device. The second user device may execute instructions to add interfaces to a super-interface or to remove interfaces from a super-interface. The second user device may execute instructions for assigning different content sources to the interfaces in a super-interface. In some embodiments, the super-interface application may modify a number of interfaces in the super-interface based on altering at a second device. For example, the super-interface application may add an interface based on altering at a second device. For example, the super-interface application may remove an interface based on altering at a second device. For example, the super-interface application may generate a third interface in a super-interface based on altering at a second device. In some embodiments, the super-interface application selects a third content source to be assigned to a first interface based on altering at a second device. For example, the super-interface application may select a third content source (e.g., "HULU") and assign the third content source to a first interface. For example, if the second device has a different aspect ratio than the first device, the super-interface application may adjust display proportions of the super-interface based on the aspect ratio at the second device when displaying the super-interface at the second device.

Figure 7:
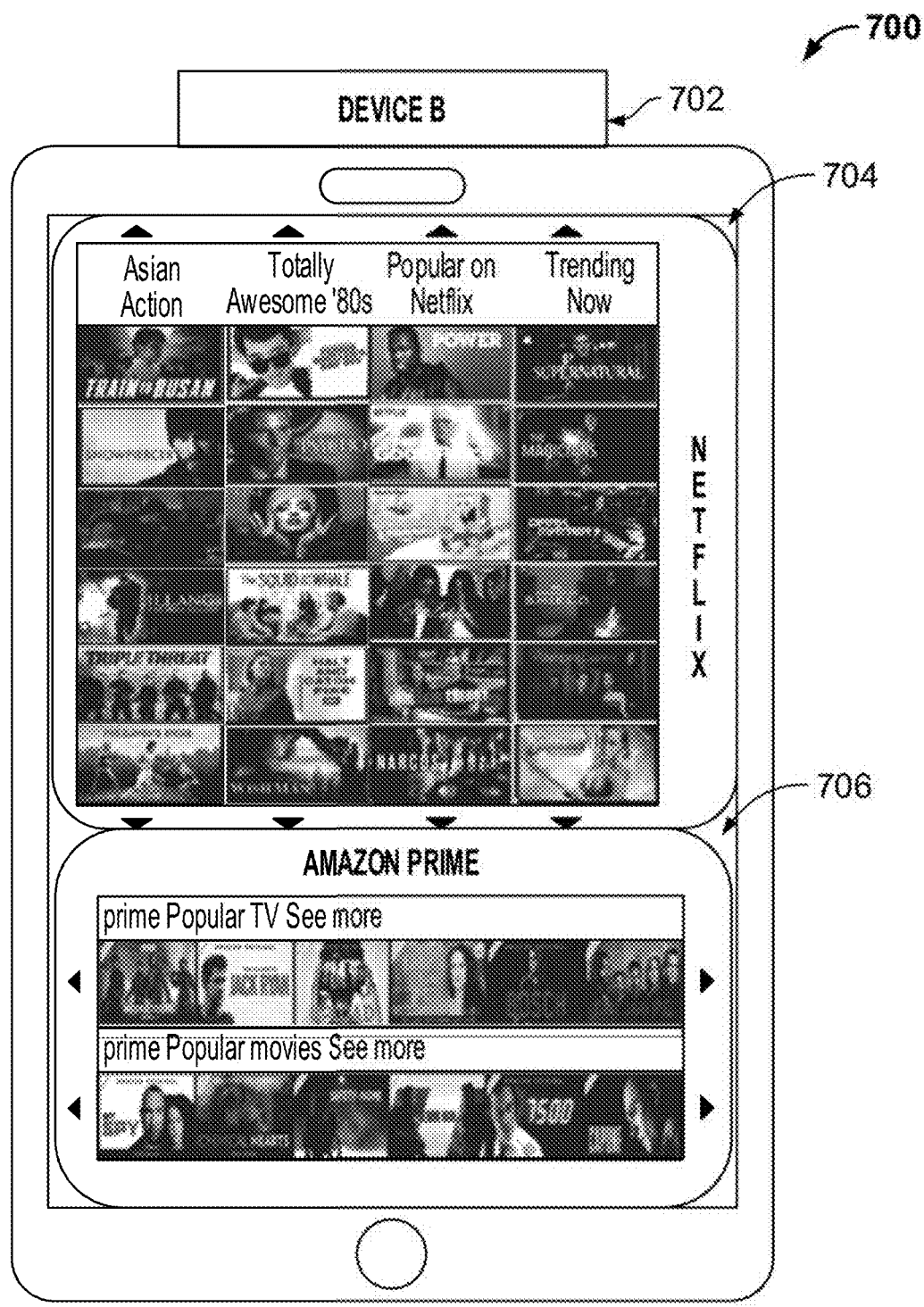
FIG. 7 shows an illustrative diagram of a super-interface displayed at a second user device, in accordance with some embodiments of the disclosure.

FIG. 7 shows an illustrative diagram of a super-interface displayed at a second user device, in accordance with some embodiments of the disclosure. FIG. 7 shows second user device 700 including a device identifier 702. The super-interface application may cause to display a super-interface at device 700. The super-interface comprises interface 704 and interface 706. The super-interface application generates interfaces 704 and 706 to display content items at device 700. Interface 704 is configured to comprise identifiers of content items available from a first content source (e.g., "NETFLIX"). Interface 706 is configured to comprise identifiers of content items available from a second content source (e.g., "AMAZON PRIME"). The super-interface application generates for display interface 704 in an altered display configuration (e.g., display configuration 610).

Figure 8:
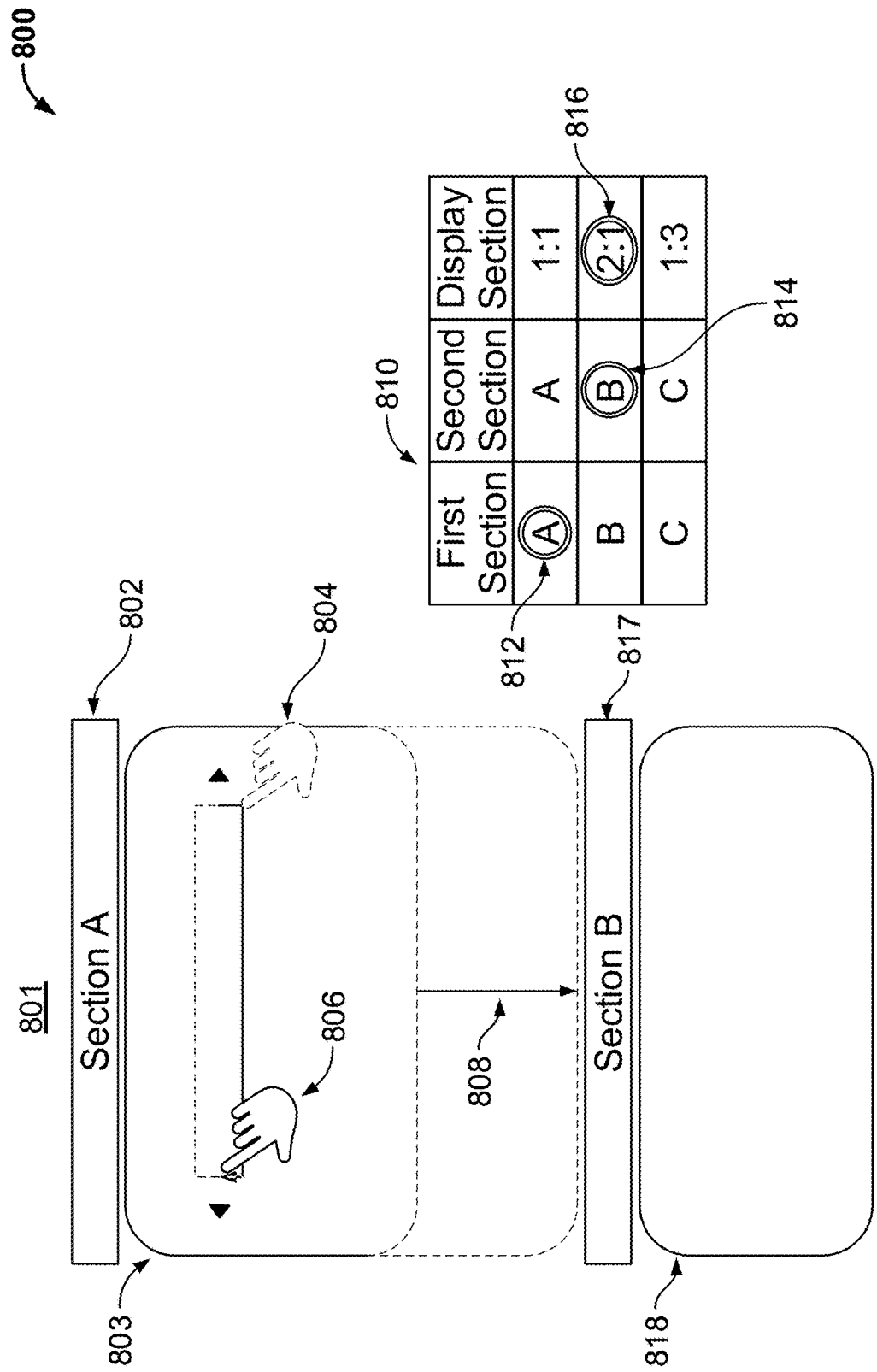
FIG. 8 shows a diagram of an illustrative system for defining a super-interface, in accordance with some embodiments of the disclosure.

FIG. 8 shows a diagram of an illustrative system for defining a super-interface, in accordance with some embodiments of the disclosure. The super-interface application may define a super-interface based on various user interactions. In some embodiments, the super-interface application may define a portion of an interface in a super-interface based on a user interaction. FIG. 8 shows a system 800 including a super-interface 801. Super-interface 801 includes a first section 803 and a second section 818 of a first interface. Section 803 includes a section identifier 802. Section 818 includes a section identifier 817. A user device may execute interactions 804 and 806 to trace a display portion at a user device. For example, a user device may sketch a display portion for displaying content by causing a line to be drawn from interaction 804 to interaction 806. The super-interface application, based on user interactions 804 and 806, defines the display portion and may reserve the display portion for displaying content based on the interactions. The super-interface application, based on a user interaction, alters display size of section 803 (as depicted by arrow 808). In some embodiments, the super-interface application may alter a display ratio including presenting options for altering a display ratio at a device. Altering a display ratio may comprise setting a relative display size. At system 800, the super-interface application presents options 810. A user device executes instructions to select option 812 that indicates section 803. The user device executes instructions to select option 814 that indicates section 818. The user device executes instructions to select option 816 that indicates a relative display size between section 803 and section 818 (e.g., a display ratio of 2 to 1). The super-interface application may adjust respective display sizes of section 803 and section 818 based on option 816. For example, the super-interface application may enlarge section 803 to be double the display size of 818 based on a display ratio of 2 to 1.

Figure 9:
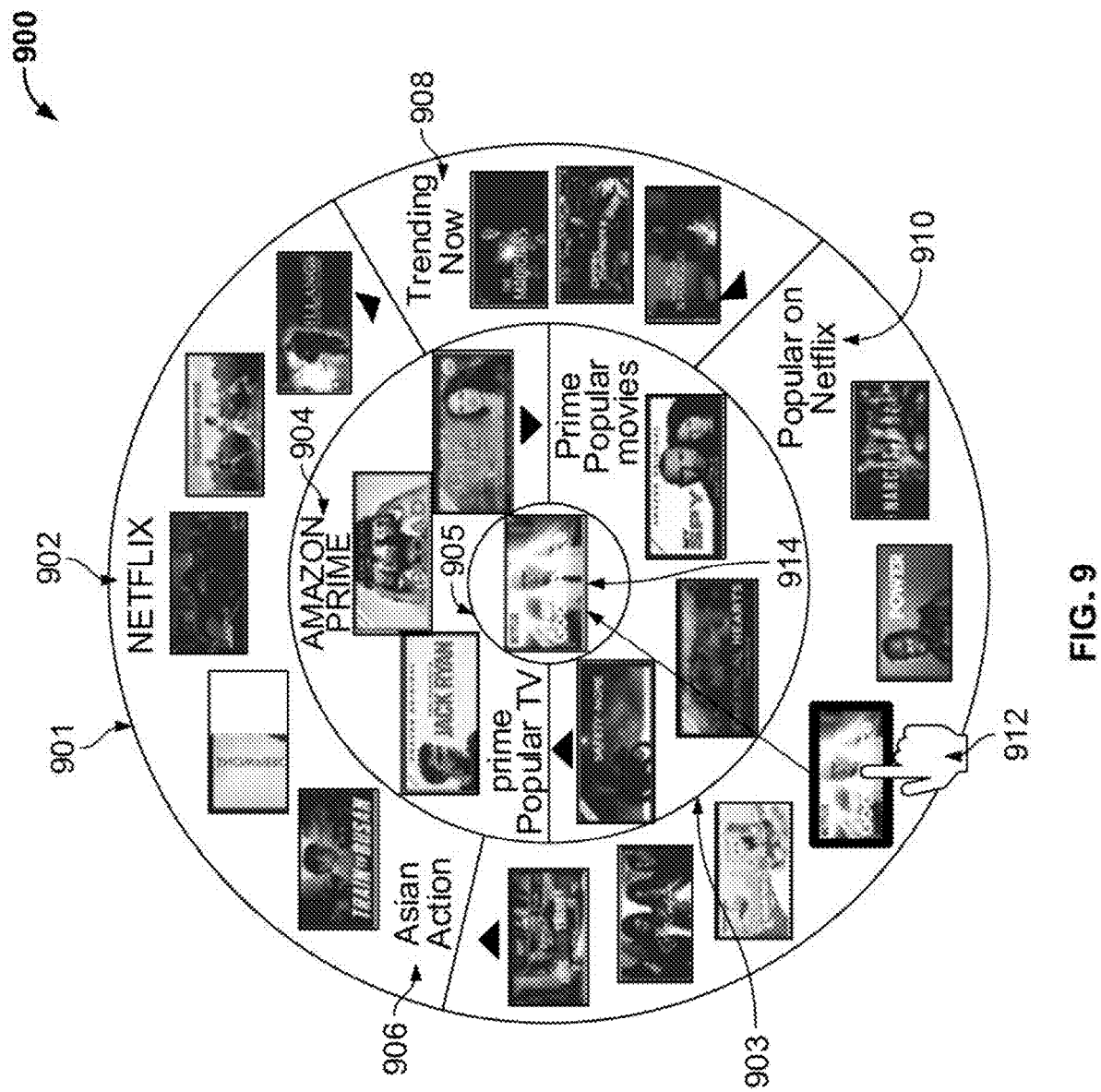
FIG. 9 shows an illustrative diagram of a super-interface in a circular display configuration, in accordance with some embodiments of the disclosure.

FIG. 9 shows an illustrative diagram of a super-interface in a circular display configuration, in accordance with some embodiments of the disclosure. In some embodiments, the super-interface application may generate for display a super-interface in a circular display configuration. For example, a display configuration template may include a circular display configuration. The super-interface application may configure the circular display configuration (e.g., based on instructions from a user device). For example, a user, via a user device, may drag a content source identifier (e.g., a title such as "Netflix") into an inner circle of the circular display configuration (e.g., as depicted by interaction 307). The circular display configuration may include interfaces of the super-interface in a ring configuration. The circular display configuration may include a central interface. The ring interface and the central interface may be concentric. In some embodiments, the super-interface application may generate for display an identifier for a selected content item in the central interface. FIG. 9 shows a super-interface 900 in one such configuration. Super-interface 900 includes a first ring interface 901, a second ring interface 903, and a central interface 905. Interfaces 901 and 903 are concentric rings around central interface 905. Interface 901 is configured to display identifiers of content available from a first content source 902. At interface 901, the content identifiers are associated with content categories 906, 908, and 910. Interface 903 is configured to display identifiers of content available from a second content source 904. Central interface 905 is configured to display an identifier of a selected content item. A user device may execute instructions to browse content identifiers in a ring interface (e.g., by executing instructions to scroll content identifiers around the ring). For example, a user may spin interface 901 to switch content categories. The super-interface application may remove a content category (e.g., "Asian Action") as the content category reaches a point on the circumference (e.g., at the twelve o'clock position) of interface 901. The super-interface application may add another content category that is shifted into interface 901 starting from that point. In some embodiments, the super-interface application may move content identifiers in a connected ring in the ring interface. In some embodiments, the super-interface application may dedicate sections in the ring interface (e.g., to content categories). For example, a user device may execute instructions that spins interface 901 to switch content categories. For example, a user device may execute instructions that shift "Big Bang Theory" out of the section corresponding to "Popular on Netflix". The super-interface application may seamlessly add another content identifier (e.g., "The 100") associated with "Popular on Netflix". A user device may execute interaction 912 that selects a content identifier in interface 901. The super-interface application detects interaction 912 and generates for display content identifier 914 in central interface 905. The super-interface application, based on interaction 912, may select identifiers of content items that are available from content source 904 for display in interface 903. For example, the super-interface application may detect a user preference for content category 910 (e.g., "Popular on Netflix") based on interaction 912. The super-interface application may select identifiers of content items available from content source 904 based on content category 910 (e.g., identifiers of content items from categories such as "prime Popular TV", "prime Popular movies", etc.). At super-interface 900, the super-interface application generates for display identifiers of content items from content source 904 in a ring configuration around central interface 905.

Figure 10:
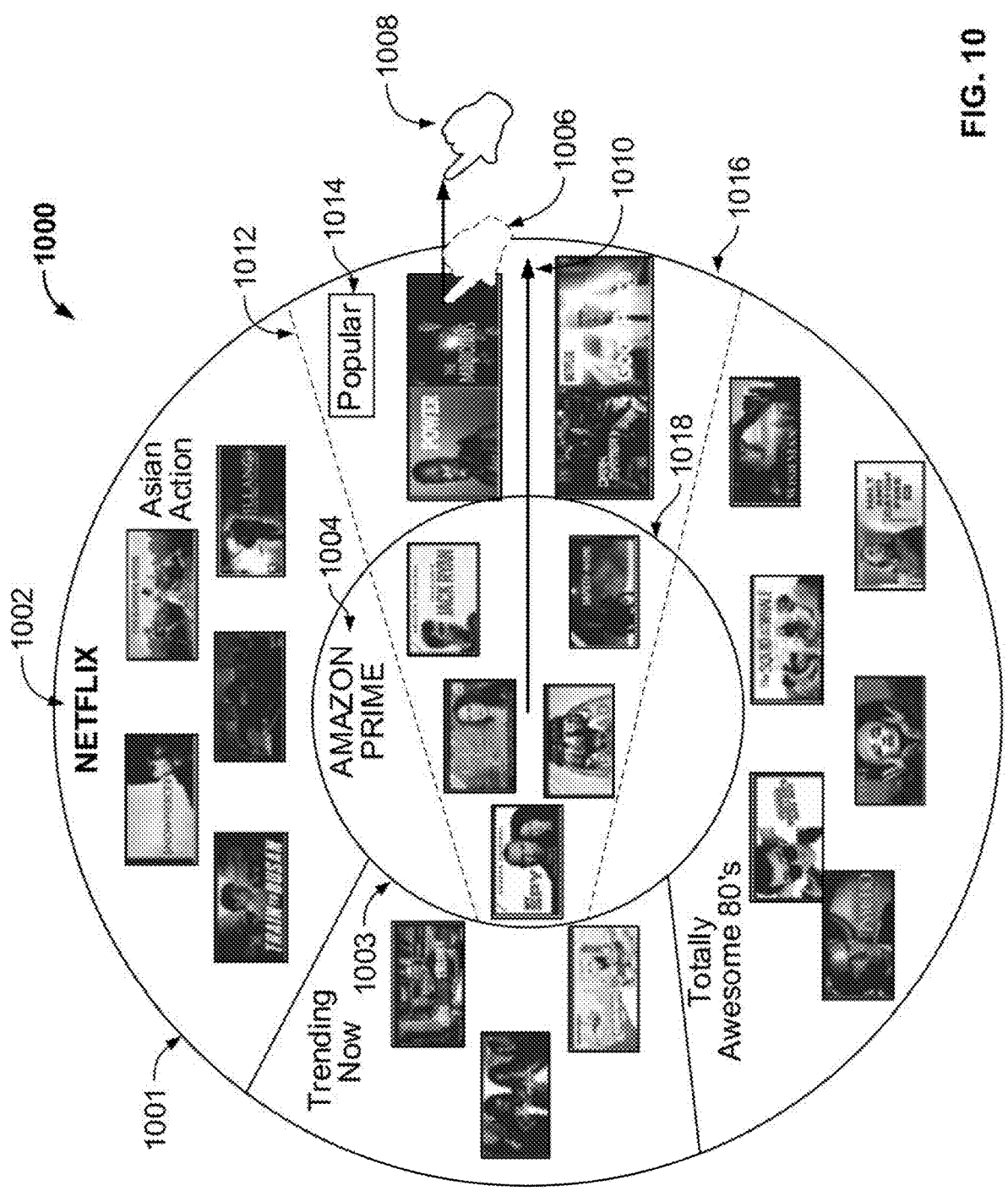
FIG. 10 shows an illustrative diagram of a super-interface in a circular display configuration, in accordance with some embodiments of the disclosure.

FIG. 10 shows an illustrative diagram of a super-interface in a circular display configuration, in accordance with some embodiments of the disclosure. In some embodiments, the super-interface application generates for display a super-interface in a modifiable circular display configuration. The super-interface application may dynamically modify the circular display configuration based on a detected user preference (e.g., detected from a user interaction). For example, the super-interface application may detect a user interaction in the super-interface that indicates interest in browsing content associated with "Popular". The super-interface application may define a section of the circular display configuration that combines sectors of the interfaces in the super-interface. The super-interface application may configure the section to scroll identifiers of content items available from multiple content sources, where the content items are associated with "Popular". For example, the super-interface application may rearrange the content identifiers in the sectors of the interfaces such that the content identifiers for each content source are displayed in separate sectors. FIG. 10 shows a super-interface 1000 in a modifiable circular display configuration. Super-interface 1000 comprises a first ring interface 1001 and a central interface 1003. Super-interface 1000 may have been super-interface 900 prior to modification by the super-interface application. Ring interface 1001 is configured to display identifiers of content items available from a first content source 1002. Central interface 1003 is configured to display identifiers of content items available from a second content source 1004. For example, central interface 1003 may have displayed the content items from content source 904 as in ring interface 903. For example, a user may spin interface 1001 to switch content categories. The super-interface application may add another category as a content category is shifted into a point on the circumference of interface 1001.

In some embodiments, the super-interface application may receive a user interaction to browse content from a user device. A user device may execute interactions with super-interface 1000. For example, the user device may execute interaction 1006 and interaction 1008 to browse super-interface 1000. For example, interaction 1006 and 1008 may indicate a swipe of a user's finger from left to right on a touch-sensitive screen on a user device. For example, interaction 1006 and 1008 may indicate a sequence of taps, where the order of the sequence indicates scrolling from left to right. For example, interaction 1006 and 1008 may indicate instructions for a user device to expand a particular section in the super-interface. The super-interface application detects a user preference based on user interactions 1006 and 1008. The super-interface application updates central interface 1003 to comprise identifiers of content items available from content source 1004, where the content items may be selected based on the detected user preference. For example, the super-interface application may detect a user preference for a content category 1014 (e.g., "Popular") based on interactions 1006 and 1008 being in close proximity to portion 1016 of interface 1001 that is associated with content category 1014. Central interface 1003 may comprise content items from content source 1004 associated with various content categories. For example, central interface 1003 may comprise content items associated with genres (e.g., "Action").

In some embodiments, the super-interface application may modify, at a user device, a super-interface to allow simultaneous scrolling of content from a first content source and a second content source. At super-interface 1000, based on interactions 1006 and 1008, the super-interface application causes modification of super-interface 1000 at the user device to allow simultaneous scrolling of content available from content source 1002 and content source 1004. For example, the super-interface application may define a section 1012 based on interactions 1006 and 1008. Section 1012 combines portion 1016 of interface 1001 associated with content category 1014 and a second portion 1018 of interface 1003. The super-interface application may rearrange content items in section 1012 to allow simultaneous scrolling of content. For example, interactions 1006 and 1008 may indicate a swipe in a horizontal direction. Based on the interactions 1006 and 1008, the super-interface determines that the content items should scroll simultaneously between interfaces along a horizontal direction from the center of super-interface 1000 (as depicted by arrow 1010). For example, a user may scroll content identifiers to the right in super-interface 1000. Identifiers in portions 1016 and 1018 may be shifted accordingly. When an identifier is moved off-screen (e.g., "Jack Ryan") in a portion (e.g., portion 1018), the super-interface application may add another content identifier in the portion (e.g., "The 100"). The super-interface application may simultaneously add content identifiers in portion 1016 and 1018 as the content identifiers are moved off-screen in super-interface 1000. The super-interface application causes the content items in central interface 1003 to be rearranged at the user device into section 1012. By rearranging, section 1012 is configured to comprise the selected content items based on the detected user preference. For example, section 1012 may be configured to comprise content items associated with content categories related to content category 1014 (e.g., "Popular"). Although not shown, portions of interface 1003 outside of section 1012 may comprise other content items available from content source 1004 (e.g., content items associated with "Action"). In this way, the super-interface application may cause to be displayed super-interface 1000 at a user device in a dynamically modified display configuration. The user device may then execute instructions to simultaneously scroll through related content from multiple content sources in super-interface 1000. For example, portion 1016 of interface 1001 may currently display content identifiers, "The Good Place" and "The Magicians", under content category 1014 (e.g., "Popular") from content source 1002 and portion 1018 of interface 1003 may currently display content identifiers, "Jack Ryan" and "Safety Nome", from content source 1002 that are associated with content category 1014. In this example, a user may scroll as depicted in interactions 1006 and 1008 (e.g., by moving a finger left to right on a touch-sensitive screen). The super-interface application may cause content identifiers in both portions 1016 and 1018 within section 1012 to shift towards the right in super-interface 1000 (e.g., "The Good Place", "The Magicians", "Jack Ryan", "Safety Nome"). The super-interface application may then add new content identifiers in each of portions 1016 and 1018 that are associated with "Popular" and available from the respective content source.

Figure 11:
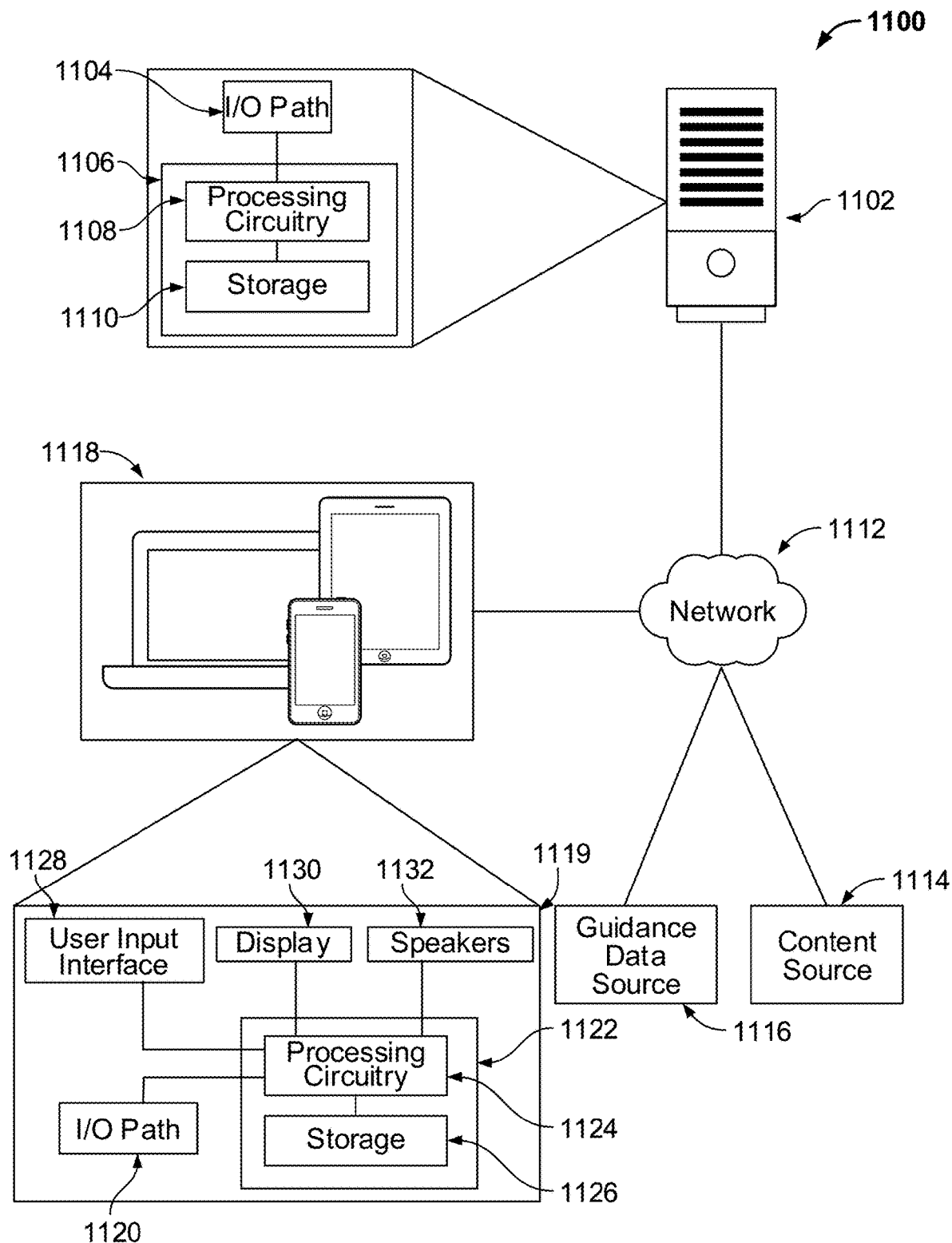
FIG. 11 a block diagram of an illustrative system, in accordance with some embodiments of the disclosure.

FIG. 11 is a block diagram of an illustrative system, in accordance with some embodiments of the disclosure. Various user equipment may access content, information, the super-interface application (and associated prompts and/or associated display screens described in various embodiments of the present disclosure). FIG. 11 shows an illustrative system 1100 for accessing the super-interface application from various user devices. System 1100 includes computing equipment 1102 (e.g., a remote server) connected to various user equipment 1118 (e.g., a user device) via network 1112. A block diagram illustrating example components of user equipment 1118 is shown for a user equipment 1119. In some embodiments, computing equipment 1102 hosts the super-interface application. In other embodiments, computing equipment 1102 acts as a proxy for the super-interface application. User equipment 1119 may be connected to network 1112 via a wired or wireless connection and may receive content and data via input/output (hereinafter "I/O") path 1120. For example, I/O path 1120 may include or be I/O circuitry. Computing equipment 1102 may be connected to network 1112 via a wired or wireless connection and may receive content and data via I/O path 1104. I/O path 1104 and/or I/O path 1120 may be I/O circuitry or include I/O circuitry, and may provide content (e.g., broadcast programming, on-demand programming, Internet content, and other video, audio, or information) and data to control circuitry 1106 and/or control circuitry 1122, which includes processing circuitry 1108 and storage 1110, and processing circuitry 1124 and storage 1126, respectively. Control circuitry 1106 may be used to send and receive commands, requests, and other suitable data using I/O path 1104. I/O path 1104 may connect control circuitry 1106 (and specifically processing circuitry 1108) to one or more communications paths (described below). Likewise, control circuitry 1122 may be used to send and receive commands, requests, and other suitable data using I/O path 1120. I/O functions may be provided by one or more of these communications paths but are shown as a single path in FIG. 11 to avoid overcomplicating the drawing.

Control circuitry 1106 and control circuitry 1122 may be based on any suitable processing circuitry 1108 (e.g., processing circuitry based on one or more microprocessors, microcontrollers, digital signal processors, programmable logic devices, etc.). In some embodiments, control circuitry 1106 executes instructions for a super-interface application stored in memory (i.e., storage 1110). In client-server based embodiments, control circuitry 1106 may include communications circuitry suitable for communicating with an application server or other networks or servers. With or without user input, the super-interface application may coordinate communication over communications circuitry between control circuitry 1106 and control circuitry 1122 to execute instructions by the super-interface application. Communications circuitry may include a modem or other circuitry for connecting to a wired or wireless local or remote communications network. Such communications may involve the Internet or any other suitable communications networks or paths (which is described in more detail below). In addition, communications circuitry may include circuitry that enables peer-to-peer communication of user equipment devices (e.g., WiFi-direct, Bluetooth, Bluetooth Low Energy, Near Field Communication, service provider proprietary networks, wired connections, etc.), or communication of user equipment devices in locations remote from each other.

User equipment 1118 of FIG. 11 may include user television equipment, user computer equipment, one or more wireless user communications devices, one or more assistant devices, Internet-Of-Things (IOT) devices, or any other type of user equipment suitable for interfacing with the super-interface application. Such devices may be referred to collectively as user equipment or user equipment devices. User equipment, on which an application is at least partially implemented, may function as a standalone device or may be part of a network of devices (e.g., each device may comprise an individual module of the super-interface application). Various network configurations of devices may be implemented and are discussed in more detail below.

User equipment 1118 may be coupled to network 1112 via various communications paths. Network 1112 may comprise one or more networks including the Internet, a mobile phone network, mobile device (e.g., iPhone) network, cable network, public switched telephone network, or other types of communications network or combinations of communications networks. The various communication paths may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the user equipment may be provided by one or more of these communications paths but are shown as a single path in FIG. 11 to avoid overcomplicating the drawing.

Although communications paths are not drawn between user equipment 1118, the user equipment may communicate directly with each other via communication paths, such as those described above in connection with network 1112, as well other short-range point-to-point communication paths, wireless paths (e.g., Bluetooth, infrared, IEEE 902-11x, etc.), or other short-range communication via wired or wireless paths. BLUETOOTH is a certification mark owned by Bluetooth SIG, INC. The user equipment devices may also communicate with each other directly through an indirect path via network 1112.

System 1100 includes content source 1114 and guidance data source 1116 coupled to network 1112 via various communication paths. The various communication paths may include any of the communication paths described above. Communications with the content source 1114 and guidance data source 1116 may be exchanged over one or more communications paths but are shown as a single path in FIG. 11 to avoid overcomplicating the drawing. In addition, there may be more than one of each of content source 1114 and guidance data source 1116, but only one of each is shown in FIG. 11 to avoid overcomplicating the drawing. Different types of each of these sources are discussed below. If desired, content source 1114 and guidance data source 1116 may be integrated as one source device. Although communications between sources 1114 and 1116 with user equipment 1118 are shown as through network 1112, in some embodiments, sources 1114 and 1116 may communicate directly with user equipment 1118 via communication paths (not shown) such as those described above.

Memory (e.g., random-access memory, read-only memory, or any other suitable memory), hard drives, optical drives, or any other suitable fixed or removable storage devices may be provided as storage 1110 and/or storage 1126. Storage 1110 and/or storage 1126 may include one or more of the above types of storage devices. Storage 1110 and/or storage 1126 may store instructions that when executed by control circuitry 1106 and/or control circuitry 1122 causes the steps described above and below to be performed by the super-interface application. Storage 1110 and/or storage 1126 may be used to store various types of content described herein and super-interface application data, including program information, guidance application and/or super-interface application settings, user preferences or profile information, or other data used in operating the guidance application and/or super-interface application. For example, storage 1110 and/or storage 1126 may store instructions which, when executed by control circuitry, causes performance of the super-interface application as described above and below. Nonvolatile memory may also be used (e.g., to launch a boot-up routine and other instructions). Although not shown in FIG. 11, control circuitry 1106 and control circuitry 1122 may be coupled to additional hardware or software for executing instructions by the super-interface application. For example, control circuitry 1106 may include hardware, and firmware associated with the hardware, for accelerating the processing and detection of user input including user interactions with a super-interface.

A user device may be configured to execute interactions with user equipment 1119 utilizing user input interface 1128 (e.g., causing control circuitry 1122 to execute various functions). User input interface 1128 may be any suitable user interface, such as a remote control, mouse, trackball, keypad, keyboard, touch screen, touch pad, stylus input, joystick, microphone, voice recognition interface, or other user input interfaces. Display 1130 may be provided as a stand-alone device, integrated with user equipment 1119, or integrated with other elements of system 1100. Display 1130 may be one or more of a monitor, a television, a liquid crystal display (LCD) for a mobile device, or any other suitable equipment for displaying content. Speakers 1132 may be provided as a stand-alone device, integrated with user equipment 1119, or integrated with other elements of system 1100. The audio content (e.g., caused by the super-interface application) may be played through speakers 1132. In some embodiments, the audio may be distributed to a receiver (not shown), which processes and outputs the audio via speakers 1132. It should be appreciated that user input interface 1128 may alternatively or additionally be configured to process any kind of input (e.g., text-based input, touch input, biometric input, or any combination thereof). Control circuitry 1106 and control circuitry 1122 may be configured to detect and identify any user input from user input interface 1128.

The super-interface application may be implemented using any suitable architecture. For example, it may be a stand-alone application wholly implemented on computing equipment 1102. In such an approach, instructions of the application are stored locally (e.g., in storage 1110), and data for use by the super-interface application is downloaded on a periodic basis (e.g., a network connection, or using another suitable approach). In some embodiments, the super-interface application is a client-server based application. Data for use by a thick or thin client implemented on computing equipment 1102 may be retrieved on-demand by issuing requests to a server or user equipment (e.g., user equipment 1118) remote to computing equipment 1102. In one example of a client-server based application, control circuitry 1106 runs a web browser that interprets web pages provided by a remote server.

In some embodiments, the super-interface application may include a plurality of modules implemented on a plurality of devices (e.g., computing equipment 1102 and user equipment 1118) to execute the features and functionalities of the super-interface application. The super-interface application may be configured such that features of the super-interface application that require processing capabilities beyond that of computing equipment 1102 are performed on a server associated with the super-interface application while other capabilities of the super-interface application are performed on computing equipment 1102. For example, the super-interface application may comprise a first module (e.g., coupled to control circuitry 1122) implemented on user equipment 1118 that detects when a user device executes interactions with an interface and may perform preliminary processing on the user input. The super-interface application may comprise a second module (e.g., coupled to control circuitry 1106) implemented on a second device (e.g., computing equipment 1102) for performing additional processing on the user input.

Though exemplary system 1100 is depicted having two devices for implementing the super-interface application, any number of modules or devices may be used. An exemplary super-interface application may comprise a plurality of modules for detecting and processing the input (e.g., voice, text, touch, biometric, etc., or any combination thereof) from a user device. Some examples of modules include but are not limited to a first module for detecting user input, a second module for detecting user interactions based on the user input, a third module for detecting user preferences based on the user interactions, and a fourth module for processing additional user input. In some embodiments, the exemplary super-interface application may be implemented across a plurality of devices. Though the super-interface application is discussed in relation to control circuitry 1106 running on a computing device (e.g., computing equipment 1102), it should be understood that any of the features and functionalities of the super-interface application may be split across multiple modules running on any control circuitry, such as control circuitry 1106 or control circuitry 1122.

User television equipment may include a set-top box, an integrated receiver decoder (IRD) for handling satellite television, a television set, a digital storage device, a DVD recorder, a local media server, or other user television equipment. One or more of these devices may be integrated to be a single device, if desired. User computer equipment may include a PC, a laptop, a tablet, a personal computer television (PC/TV), a PC media server, a PC media center, or other user computer equipment. Wireless user communications devices may include a mobile telephone, a portable video player, a portable music player, a portable gaming machine, a wireless remote control, or other wireless devices. Assistant devices may include a smart speaker, a standalone voice assistant, a smart home hub, etc. IOT devices may include any of a plurality of devices (e.g., a light controller, washing machine, security camera, etc.) in a residence, office, or other location having such devices.

It should be noted that the lines have become blurred when trying to classify a device as one of the above devices. In fact, each of user television equipment, user computer equipment, wireless user communications device, assistant device, and IOT device may utilize at least some of the system features described above and, as a result, include some or all of the features of the super-interface application described herein. For example, user television equipment may implement a super-interface application that is activated upon detecting an input comprising a user interaction. The super-interface application may have the same layout on the various different types of user equipment or may be tailored to the display capabilities of the user equipment. For example, on a user computer equipment, the super-interface application may provide a super-interface in a visual layout that is fitted to a display of the user computer equipment. In another example, the super-interface may be scaled down for wireless user communications devices. In another example, the super-interface application may not provide a graphical user interface (GUI) and may continuously provide the super-interface and detect user input such as user interactions with user input interface 1128. Various network-connected devices or IOT devices may be connected via a localized network (e.g., a local area network) and may be capable of being controlled using IOT applications and using the super-interface application.

In system 1100, there may be more than one of each type of user equipment and/or more types of user equipment but some examples are shown in FIG. 11 to avoid overcomplicating the drawing. In addition, each user may utilize more than one type of user equipment (e.g., a user may have a television set and a computer) and also more than one of each type of user equipment (e.g., a user may have an assistant device, a mobile telephone, and/or multiple IOT devices).

The user may also set various settings to maintain consistent settings across various devices (e.g., in-home devices and remote devices). For example, an environmental setting (e.g., display brightness) on a personal computer of the user may be set at an office of the user on his or her super-interface application, and such an environmental setting may also appear on the super-interface application in the user's in-home devices (e.g., user television equipment and user computer equipment) as well as the user's mobile devices, if desired. Therefore, changes made on one user equipment device can change the experience on another user equipment device, regardless of whether they are the same or a different type of user equipment device. In addition, the changes made may be based on settings input by a user, as well as user activity monitored by the super-interface application.

Content source 1114 may store or index a plurality of data used for responding to user prompts received by the super-interface application. In some embodiments, content source 1114 may index the location of content located on servers located remotely or local to content source 1114. In response to receiving a query (e.g., in the form of voice, text, touch, biometric or any combination thereof), the super-interface application may access the index stored on content source 1114 and may identify a server (e.g., a database stored on a server) comprising the information to respond to the user's query. For example, the super-interface application may receive a voice query requesting content for display. In response to receiving the query, the super-interface application may search content source 1114 for a content service with content matching the query, may access the content service for the content, and may retrieve the content that matches the query.

Guidance data source 1116 may provide data used during the operation or function of the super-interface application. For example, guidance data source 1116 may store user profile information, information about preferences of the user, browsing activity and user interaction information associated with the user, etc. In some embodiments, updates for the super-interface application may be downloaded via guidance data source 1116.

The super-interface application may be, for example, a stand-alone application implemented on user equipment. In other embodiments, the super-interface application may be a client-server application where only the client resides on the user equipment. For example, the super-interface application may be implemented partially as a client application on control circuitry 1122 and partially on a remote server as a server application (e.g., computing equipment 1102). The guidance application displays and/or super-interface application displays may be generated by guidance data source 1116, content source 1114, and/or computing equipment 1102 and transmitted to the user equipment. Guidance data source 1116, content source 1114, and computing equipment 1102 may transmit data for storage on user equipment, which then generates the super-interface application displays based on instructions processed by control circuitry.

System 1100 is intended to illustrate a number of approaches, or configurations, by which user equipment devices and sources and servers may communicate with each other. The present invention may be applied in any one or a subset of these approaches, or in a system employing other approaches for generating and providing a super-interface application.

Figure 12:
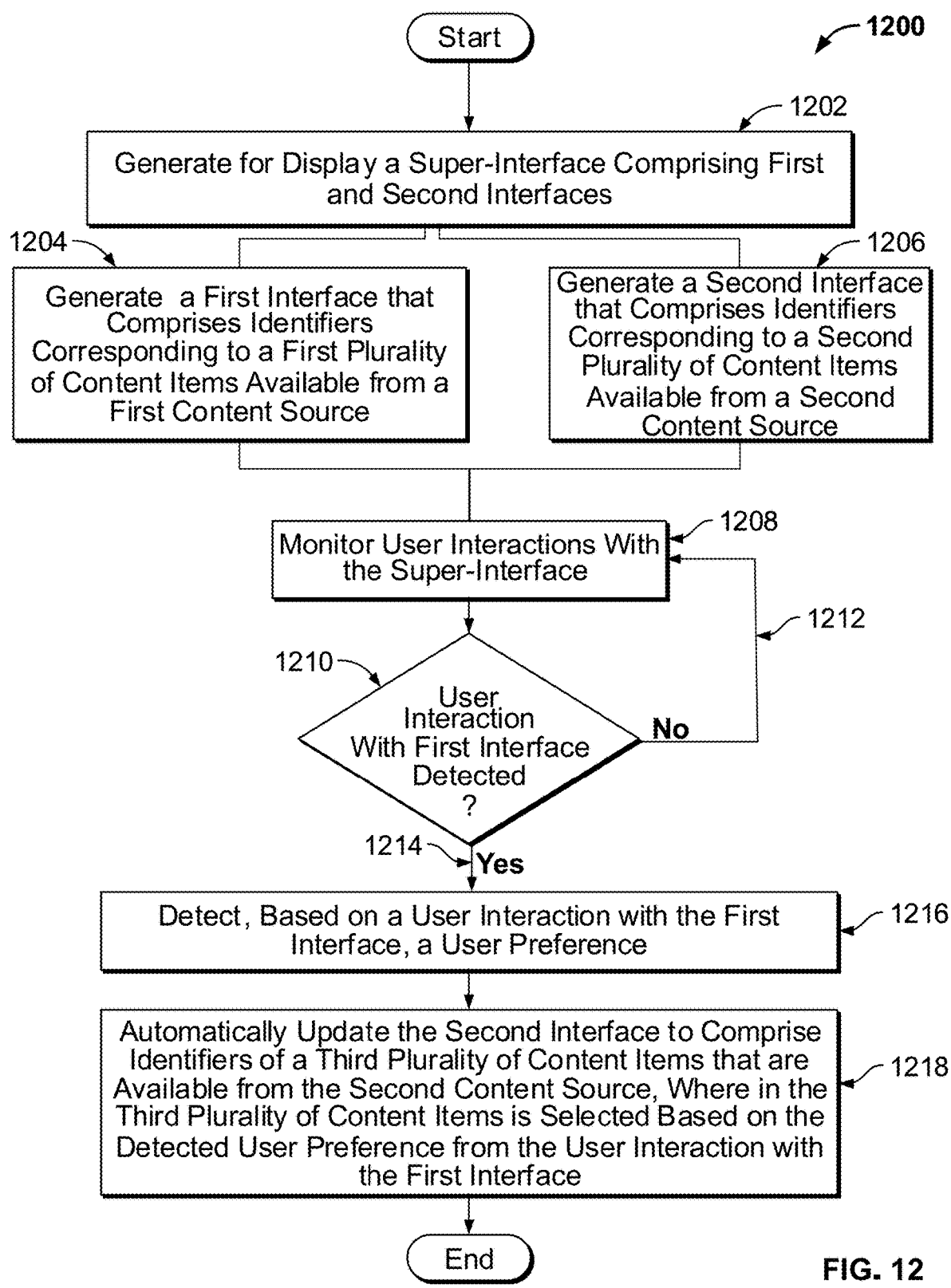
FIG. 12 is a flow diagram of a process for generating a super-interface, in accordance with some embodiments of the disclosure.

FIG. 12 is a flow diagram of a process 1200 for generating a super-interface, in accordance with some embodiments of the disclosure. For example, the super-interface application using control circuitry 1106 may execute process 1200 to generate a super-interface. Process 1200 starts with 1202. At 1202, control circuitry generates for display a super-interface comprising first and second interfaces. At 1204, control circuitry generates a first interface that comprises identifiers corresponding to a first plurality of content items available from a first content source. At 1206, control circuitry generates a second interface that comprises identifiers corresponding to a second plurality of content items available from a second content source. Control circuitry may execute 1204 and 1206 separately or at the same time. At 1208, control circuitry monitors user interactions with the super-interface (e.g., at a user device). At 1210, control circuitry determines whether a user interaction with a first interface is detected. In response to determining that a user interaction with the first interface has not been detected, control circuitry may proceed to 1208. In response to determining that a user interaction with the first interface has been detected, control circuitry may proceed to 1216. In some embodiments, the super-interface application, using control circuitry, may continuously monitor user interactions with the super-interface. It should be noted that control circuitry may detect a user interaction with any interface of the super-interface. Process 1200 may be adjusted accordingly.

At 1216, control circuitry detects, based on the user interaction with the first interface, a user preference. For example, referring to FIG. 1A, the super-interface application may detect a user preference for content category 112 based on interaction 110. At 1218, control circuitry automatically updates the second interface to comprise identifiers of a third plurality of content items that are available from the second content source, wherein the third plurality of content items is selected based on the detected user preference from the user interaction with the first interface. For example, referring to FIG. 1A, the super-interface application may determine interaction 110 indicates an interest on content associated with a content category (e.g., "Popular"). The super-interface application may select identifiers of content items available from the second content source (e.g., "Amazon Prime"), wherein the content items are associated with the content category of interest (e.g., popular content on "Amazon Prime"). In some embodiments, control circuitry may return to any part of process 1200 after ending process 1200. For example, the super-interface application may loop back to 1208 after executing 1218. In this way, the super-interface application may continuously monitor various user interactions with a super-interface and update interfaces of the super-interface based on a detected user preference from the user interactions.

Figure 13:
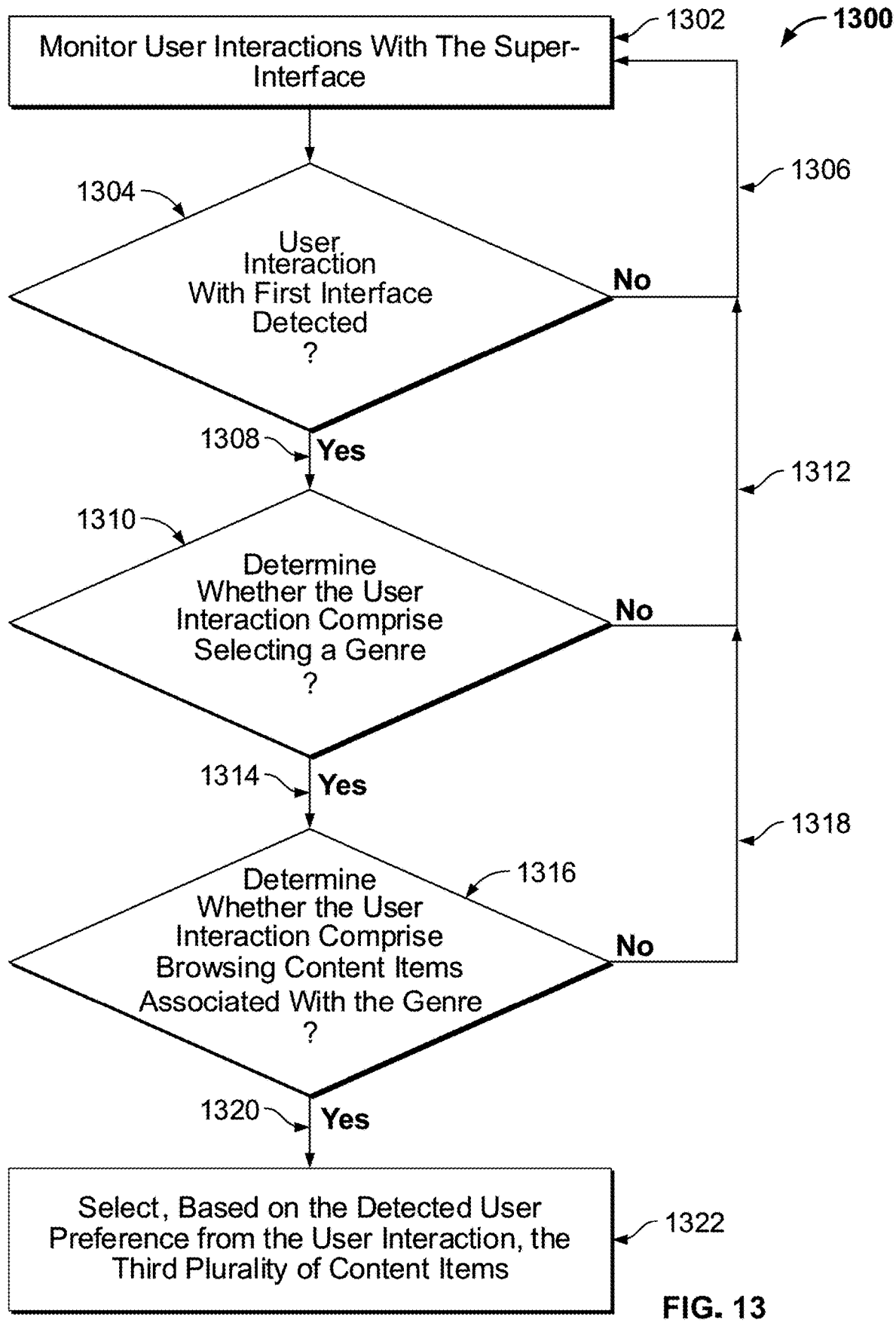
FIG. 13 is a flow diagram of a process for selecting content identifiers based on a detected user preference, in accordance with some embodiments of the disclosure.

FIG. 13 is a flow diagram of a process 1300 for selecting content identifiers based on a detected user preference, in accordance with some embodiments of the disclosure. For example, the super-interface application using control circuitry 1106 may execute process 1300 to select content identifiers based on a detected user preference. Process 1300 starts at 1302. At 1302, control circuitry monitors user interactions with a super-interface (e.g., at a user device). At 1304, control circuitry determines whether a user interaction with a first interface is detected. In response to determining that a user interaction with the first interface is not detected, control circuitry may return to 1302. In response to determining that a user interaction with the first interface is detected, control circuitry may proceed to 1310. At 1310, control circuitry determines whether the user interaction comprises selecting a genre. In response to determining that the user interaction does not comprise selecting a genre, control circuitry may return to any earlier part of process 1300. Otherwise, in response to determining that the user interaction comprises selecting a genre, control circuitry may proceed to 1316. At 1316, control circuitry determines whether the user interaction comprises browsing identifiers of content items associated with the selected genre. If the user interaction does not comprise browsing identifiers of content items associated with the selected genre, the control circuitry returns to any earlier part of process 1300. If the user interaction comprises browsing identifiers of content items associated with the selected genre, control circuitry may proceed to 1322. At 1322, control circuitry selects, based on the detected user preference from the user interaction, identifiers for the third plurality of content items of the same genre selected at 1316. For example, the super-interface application using control circuitry 1106 may detect a user preference for a genre based on a user interaction comprising browsing identifiers of content items associated with the genre. The super-interface application may select identifiers of content items based on the user preference of the genre.

Figure 14:
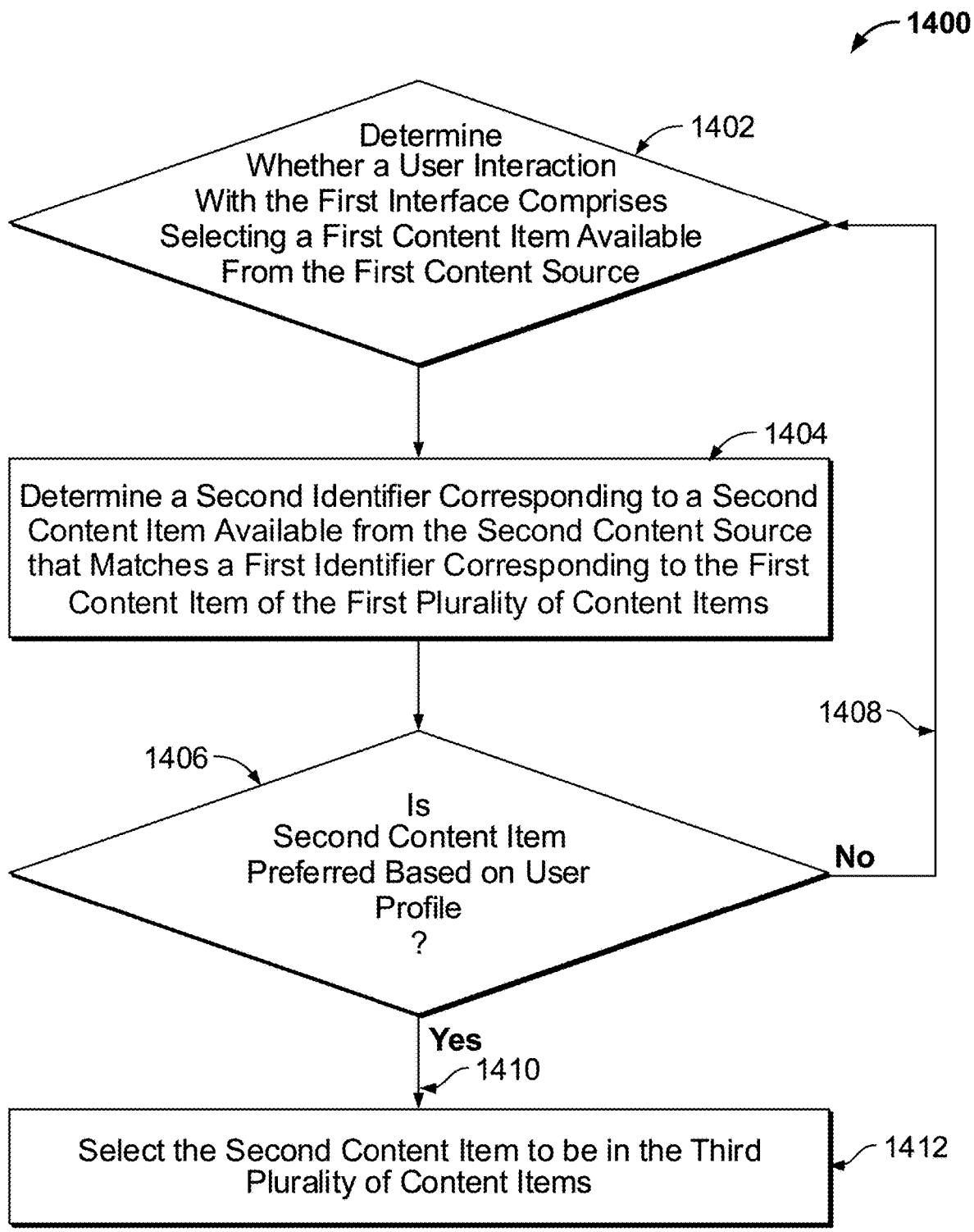
FIG. 14 is a flow diagram of a process for selecting content identifiers based on a detected user preference, in accordance with some embodiments of the disclosure.

FIG. 14 is a flow diagram of a process 1400 for selecting content identifiers based on a detected user preference, in accordance with some embodiments of the disclosure. Process 1400 starts at 1402. At 1402, control circuitry determines whether a user interaction with a first interface comprises selecting a first identifier of a first content item of a first plurality of items available from a first content source. In response to determining that the user interaction does not comprise selecting the first identifier of the first content item, control circuitry may continue to another process or return to 1402. In response to determining that the user interaction comprises selecting the first identifier of the first content item, control circuitry continues to 1404. At 1404, control circuitry determines a second identifier corresponding to a second content item that matches the first identifier corresponding to the first content item of the first plurality of content items. For example, the super-interface application using control circuitry 1106 may query a second content source assigned to a second interface of the super-interface. Based on the query, the super-interface application may receive identifiers of content items from the second content source. The super-interface application may determine an identifier of the identifiers from the second content source based on matching the first identifier. At 1406, control circuitry determines whether the second content item is preferred based on a user profile. For example, the super-interface application, using control circuitry, may access a user profile and compare attributes for preferred content from the user profile with the second content item and/or the second content source. For example, a user profile may include access logs that show the user consumes content more from the second content source. For example, the user profile may include an indication of preferring high-definition quality and/or fewer advertisements in a content item. For example, the super-interface application may determine that the second content item is preferred because the second content item has attributes matching with the user profile. For example, the second content item may have fewer advertisements and the super-interface application determines that this matches the user profile. For example, the super-interface application may determine that the second content item is preferred because the second content source has a lower access cost for the second content item. In response to determining that the second content item is not preferred, control circuitry may follow path 1408 and loop back to 1402. Otherwise, control circuitry may continue along path 1410 to 1412. At 1412, control circuitry selects the second content item to be included in a third plurality of content items. For example, the super-interface application using control circuitry 1106 may update the second interface to include the second content item in the third plurality of content items based on determining that the second content item is preferred.

Figure 15:
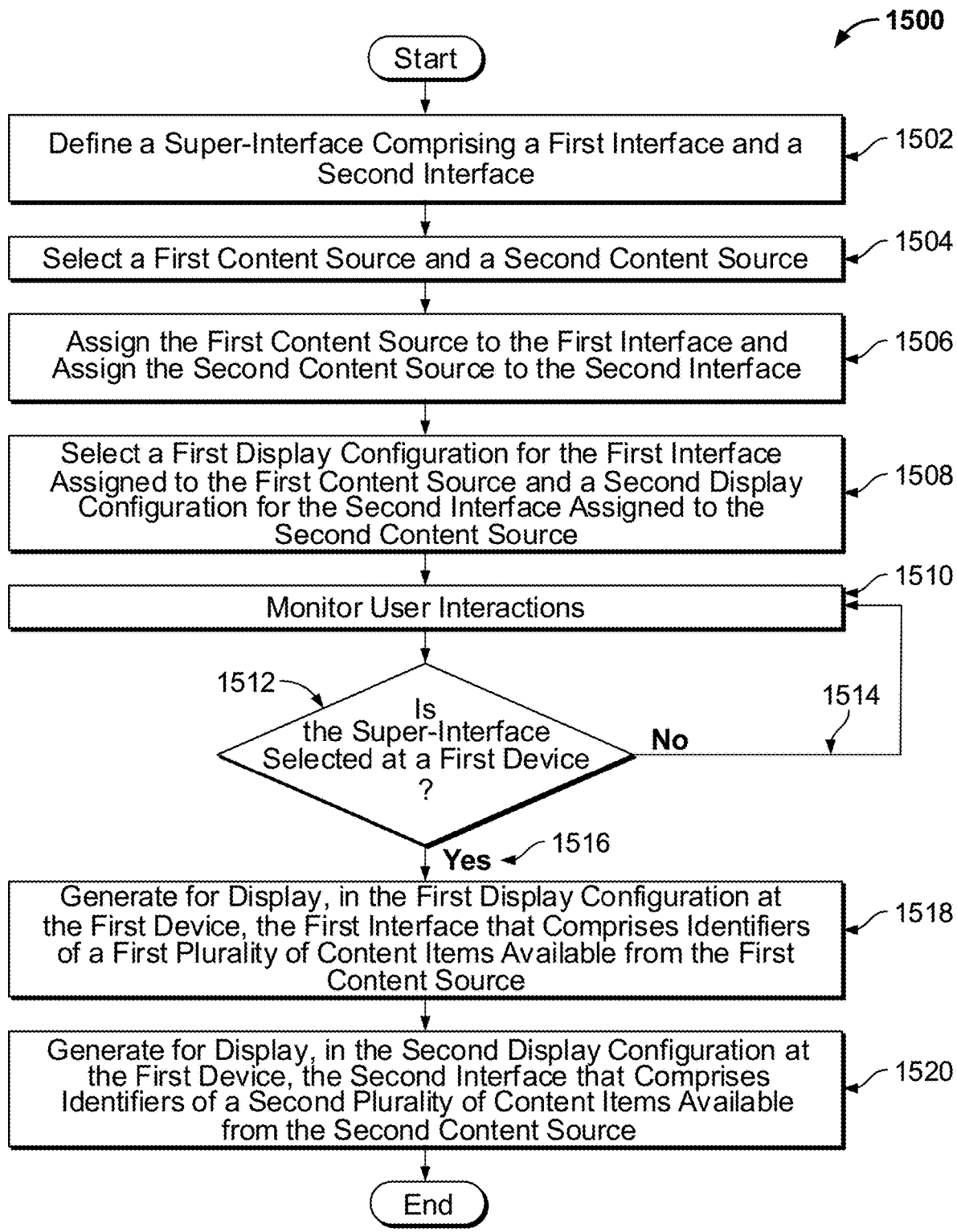
FIG. 15 is a flow diagram of a process for defining a super-interface, in accordance with some embodiments of the disclosure.

FIG. 15 is a flow diagram of a process 1500 for defining a super-interface, in accordance with some embodiments of the disclosure. Process 1500 starts at 1502. At 1502, control circuitry defines a super-interface comprising a first interface and a second interface. At 1504, control circuitry selects a first content source and a second content source. At 1506, control circuitry assigns the first content source to the first interface and assigns the second content source to the second interface. For example, the super-interface application using control circuitry 1106 may select a first content source to be assigned to the first interface. For example, the super-interface application using control circuitry 1106 may select a second content source to be assigned to the second interface. At 1508, control circuitry selects a first display configuration for the first interface assigned to the first content source and a second display configuration for the second interface assigned to the second content source. At 1510, control circuitry monitors user interactions (e.g., at a first user device). At 1512, control circuitry determines whether the super-interface is selected at the first user device based on the user interactions. If the super-interface has not been selected, control circuitry follows path 1514 and loops back to 1510. In response to determining that the super-interface is selected at the first device, control circuitry follows path 1516 and continues to 1518. At 1518, control circuitry generates for display, in the first display configuration at the first device, the first interface that comprises identifiers of a first plurality of content items available from the first content source. At 1520, control circuitry generates for display, in the second display configuration at the first device, the second interface that comprises identifiers of a second plurality of content items available from the second content source.

Figure 16:
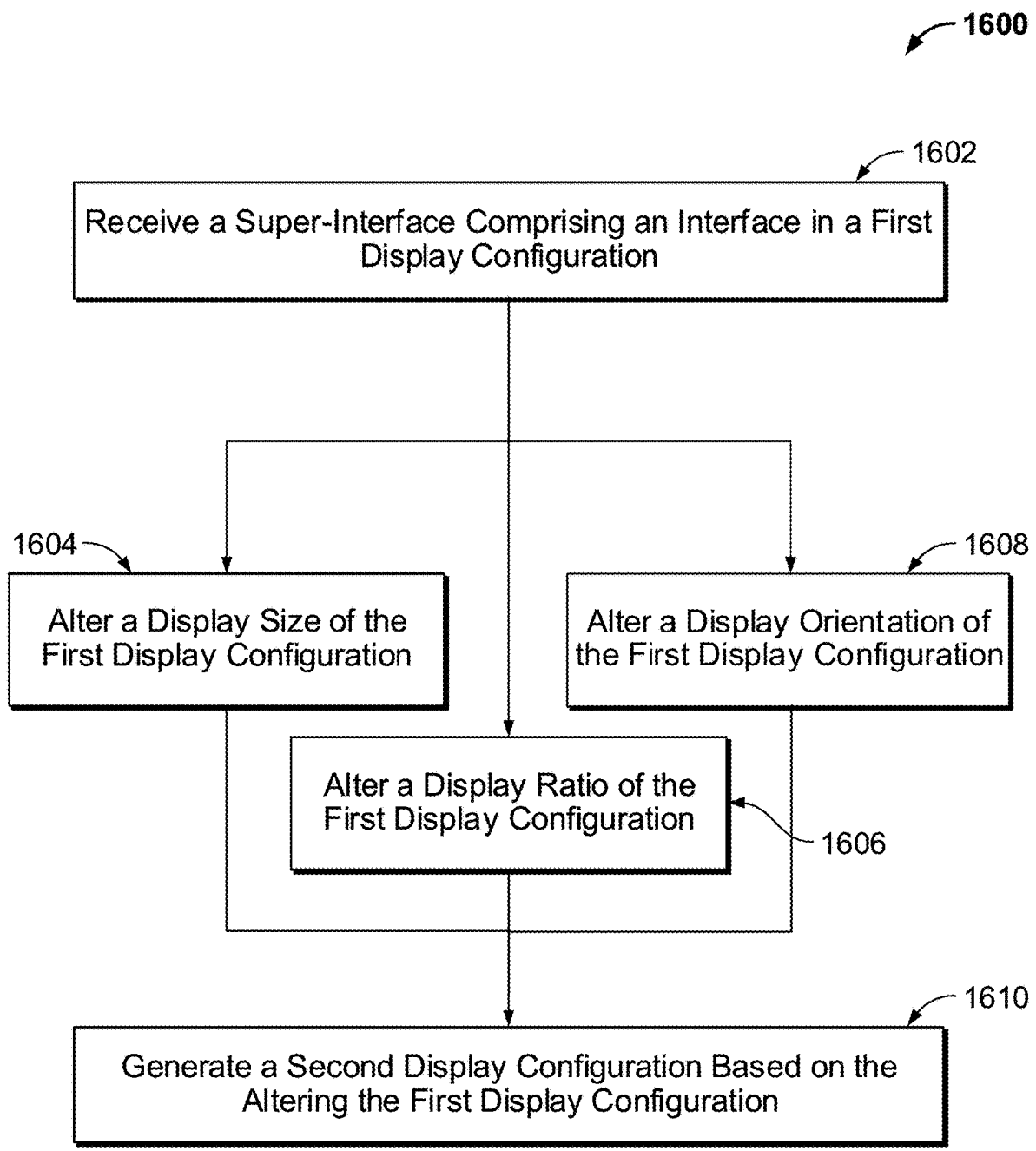
FIG. 16 is a flow diagram of a process for altering a super-interface on a user device, in accordance with some embodiments of the disclosure.

FIG. 16 is a flow diagram of a process 1600 for altering a super-interface on a user device, in accordance with some embodiments of the disclosure. Process 1600 starts at 1602. At 1602, control circuitry receives a super-interface comprising an interface in a first display configuration. At 1604, control circuitry may alter a display size of the first display configuration. At 1606, control circuitry may alter a display ratio of the first display configuration. Control circuitry, when altering the display ratio, may set a relative display size. At 1608, control circuitry may alter a display orientation of the first display configuration. Control circuitry may execute any or all of 1604-1608 in any order. Process 1600 continues to 1610. At 1610, control circuitry generates a second display configuration based on the altering the first display configuration. For example, the super-interface application, using control circuitry 1106, may alter a first display configuration of an interface in the super-interface. Based on the altering, the super-interface application may generate a second display configuration.

Figure 17:
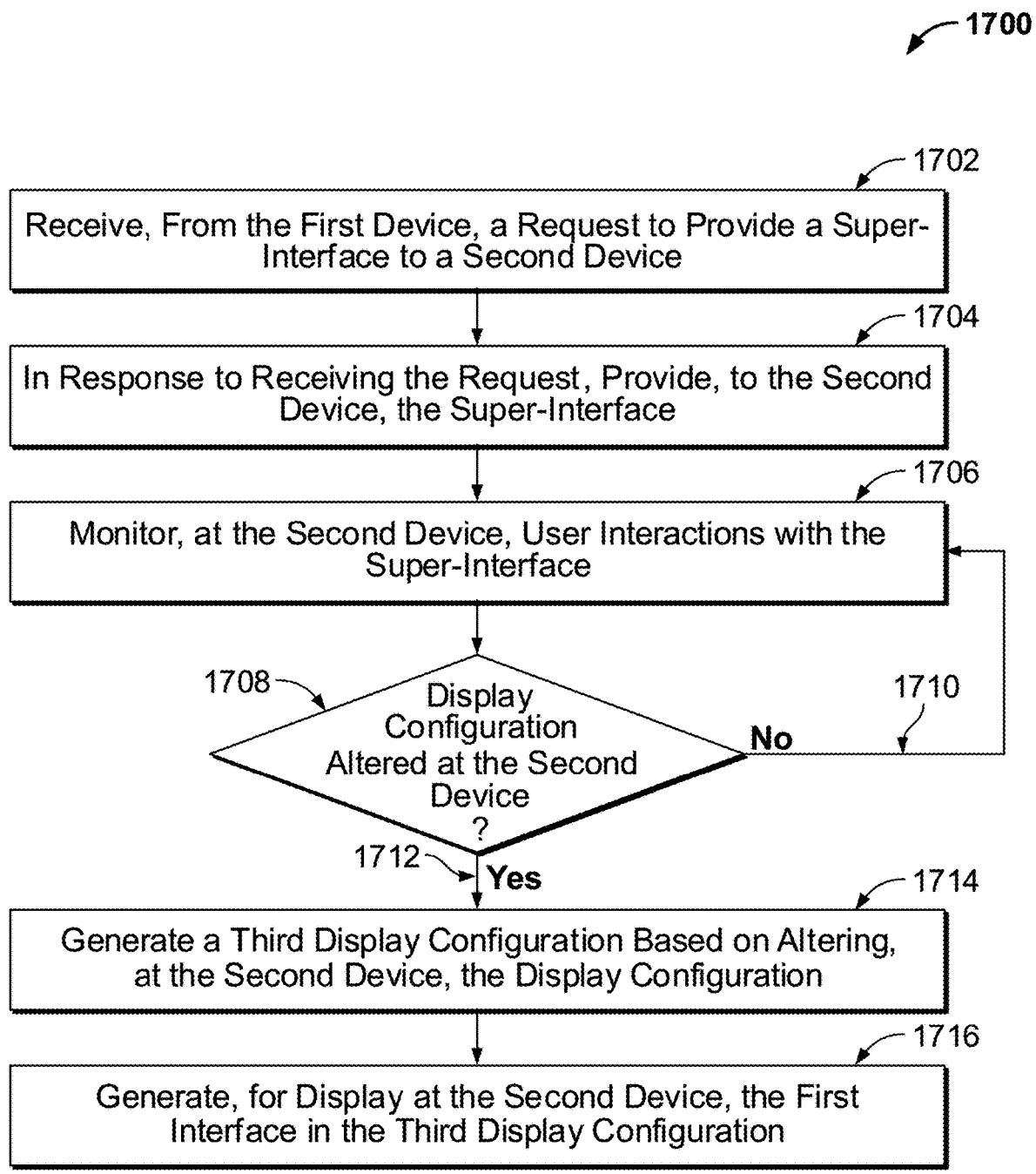
FIG. 17 is a flow diagram of a process for providing a super-interface to a second user device and altering the super-interface on the second user device, in accordance with some embodiments of the disclosure.

FIG. 17 is a flow diagram of a process 1700 for providing a super-interface to a second user device and altering the super-interface on the second user device, in accordance with some embodiments of the disclosure. Process 1700 starts at 1702. At 1702, control circuitry receives, from a first device, a request to provide a super-interface to a second device. At 1704, control circuitry, in response to receiving the request, provides the super-interface to the second device. In some embodiments, access to the super-interface is provided to the second device. At 1706, control circuitry monitors, at the second device, user interactions with the super interface. At 1708, control circuitry determines whether a display configuration (e.g., of the first interface) is altered at the second device. If the display configuration has not been altered, control circuitry may follow path 1710 and loop back to 1706. In response to determining that the display configuration has been altered, control circuitry may follow path 1712 and continue to 1714. At 1714, control circuitry generates a third display configuration based on the altering the display configuration at the second device. At 1716, control circuitry generates for display, at the second device, the first interface in the third display configuration.

Figure 18:
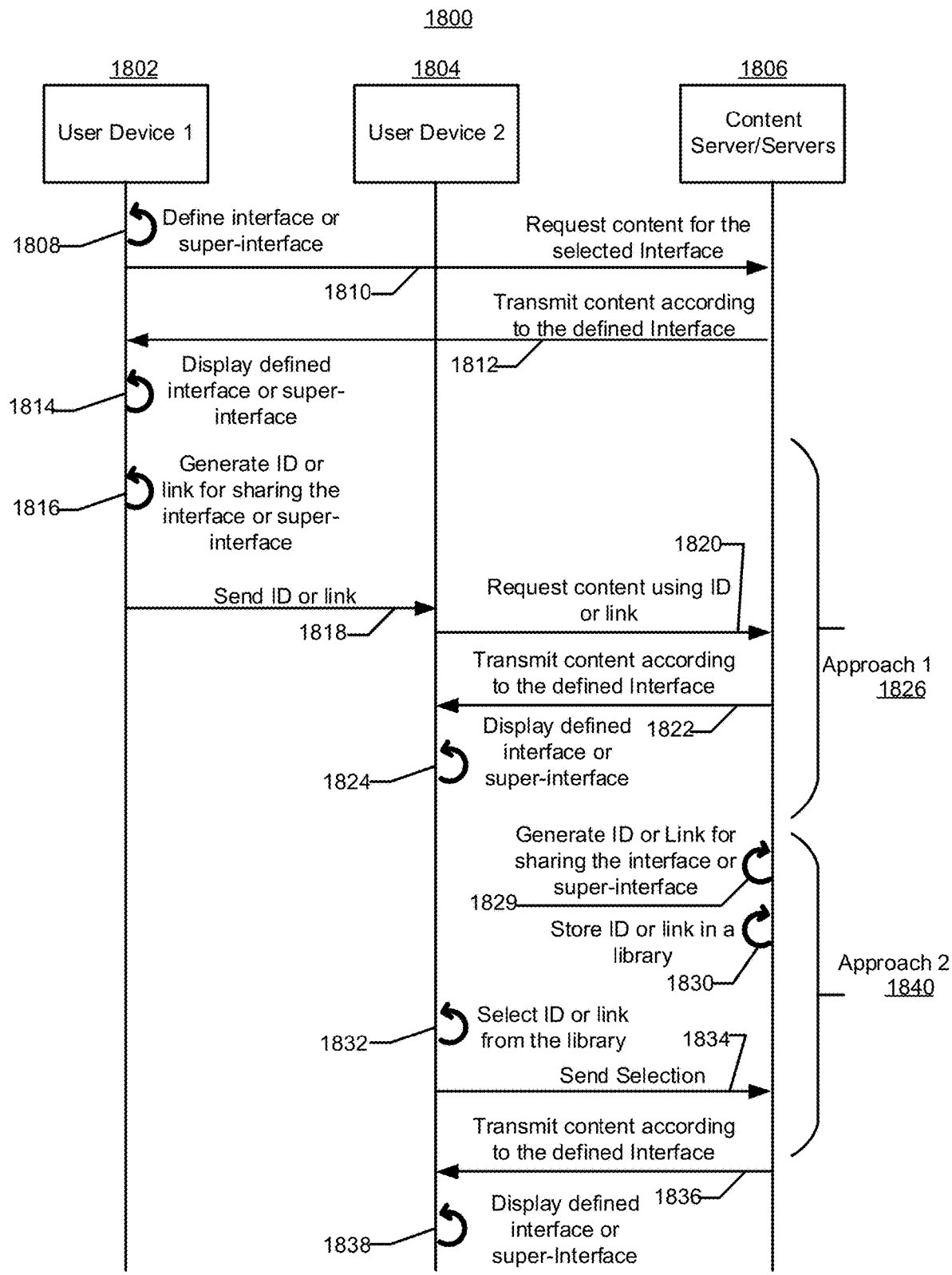
FIG. 18 is a flow diagram of a process for providing a super-interface or an interface to a second user device, in accordance with some embodiments of the disclosure.

FIG. 18 is a flow diagram of a process 1800 for providing an interface and/or a super-interface to a second user device, in accordance with some embodiments of the disclosure. In some embodiments, process 1800 may be performed by one or more devices 1118 and/or 1102 of FIG. 11. For example, steps 1808, 1810, 1814, 1816, 1818, and 1828 may be performed by control circuitry of a first device 1802 of devices 1118. Steps 1820, 1824, 1832, 1834, and 1838 may be performed by control circuitry of a second device 1804 of devices 1118. Steps 1812, 1822, 1829, 1830, and 1836 may be performed by control circuitry of server or servers 1806 (e.g., server 1102).

Process 1800 begins when user device 1802 defines an interface or super interface. For example, the interface or super interface may be defined using any suitable technique described above (e.g., as described in FIGS. 3, 5, and/or 8). In addition to defining content sources for the interface or super interface, user device 1802 may also define user-specified parameters for each source. For example, user-specified parameters may include genre, network, and/or content type. In some embodiments, each content identifiers from each selected content source may be defined to be filtered according to user-specified parameters. For example, user device 1802 may select "Netflix" as one of the content sources for the super-interface, and further limit the display of content identifiers from Netflix to a list of predefined content categories or carousels, (e.g., "Trending Now", "Netflix Exclusives", "80s Action Movies", and "Rom Coms").

In some embodiment, user device 1802 may be used to define a single source interface instead of a super-interface. For example, Netflix interface (e.g., defined as discussed above) may be a single displayed content source in the user-defined interface. In some embodiment, user device 1802 may be used to define multiple sources for the super-interface. For example, the super-interface may be defined to display a first user-defined list of carousels for Netflix and a second user-defined list of carousels for Amazon Prime.

At step 1810, user device 1802 may request (e.g., via an API provided by server 1806) content identifiers to be displayed according to the designed interface or super-interface from server 1806. At step 1812, server 1806 may provide for display a list of content identifiers according to definitions of the interface or the super-interface. For example, server 1806 may provide for display on device 1802 content identifiers fitting selected content carousels. For example, a respective list of content items identifiers for "Trending Now", for "Netflix Exclusives", for "80s Action Movies", and for "Rom Coms" may be provided to be displayed in an interface or super defined at step 1808. At step 1814, the content items identifiers may be generated for display at device 1802 (e.g., as shown in FIG. 1).

User of device 1802 may then initiate sharing of the designed interface or the super-interface. For example, the user may press a "share button" or use any other suitable user interface element to initiate sharing of the interface or super-interface.

In one approach 1826, device 1802 may generate a sharable ID or a sharable link for sending to other users (e.g., to a user of user device 1804). In some embodiments, sharable ID or a sharable link may be generated by server 1806. Server 1806, may also store the interface definitions of the designed interface or the super-interface in association with the link or with the ID. For example, the link may take a form of www.<domain>.com/share/ABC123, where "<domain>" is the domain name of server 1806 on a public network (e.g., on the Internet) and where "ABC123" is a unique identifier of the designed interface or the super-interface.

At 1818, user device 1802 may transmit the link or the ID to user device 1804. For example, the link may be sent via an email, via a text message, or via any other suitable commutation protocol. At 1820, user device 1802 may request the designed user interface using the link or the ID from server 1806. For example, the user of device 1806 may paste the link into a web browser or paste the ID into an interface sharing app provided by server 1086. At step 1822, server 1806 finds an interface or super-interface associated with the unique link or with the unique ID and transmits the interface or the super-interface to device 1804. At 1824, device 1804 may generate for display the defined interface or super-interface similarly as to how it would be displayed on device 1802 at step 1814.

In some embodiment, the received defined interface may be blended with an interface that is already being shown at device 1804. For example, if device 1804 is currently displaying a certain interface that includes categories defined for source "Amazon prime," and it receives a defined interface that includes categories defined for source "Netflix," device 1806 may begin to display a super interface that includes categories from both "Amazon prime" and from "Netflix" (e.g., as shown in FIG. 1). In another example, the newly received interface can be added to an already displayed super-interface (e.g., instead of showing a super interface with two sources, device 1804 may begin showing a super interface with three sources).

In another approach 1840, server 1806 may store all or some of the interfaces that are defined by user devices. For example, at step 1829, server 1806 may assign a unique link or ID (e.g. as described in step 1816) to a newly submitted interface received at step 1810. At step 1830, server 1806 may store the defined interface or super-interface in a library of interfaces in association with the ID or with the unique link.

At step 1832, device 1804 may allow a user of device 1804 to browse the library of interfaces or super interfaces (e.g., by showing a description and/or a preview of each stored interface or super interface). A user of device 1804 may then select one of the stored interfaces or super interfaces (e.g., by selecting an ID or hyperlink for that interface or super interface). At step 1834, the selection is then sent to server 1806.

After the selection at step 1834 is received by server 1806, server 1806 fetches the interface or super interface identified by the selected ID or hyperlink. At step 1836, sever 1806 transmits the interface or super-interface to device 1804. At 1838, device 1804 may generate for display the defined interface or super-interface similarly as to how it would be displayed on device 1802 at step 1814. In some embodiments, device 1804 may blend the received interface or super interface with an existing interface or super interface.

It is contemplated that the various processes as described in relation to FIGS. 12-18 may be used with any other embodiment of this disclosure. In addition, the descriptions in relation to the processes of FIGS. 12-18 may be done in alternative orders or in parallel to further the purposes of this disclosure. For example, conditional statements and logical evaluations may be performed in any order or in parallel or simultaneously to reduce latency or increase the performance (e.g., speed, efficiency, etc.) of the system or method. As a further example, in some embodiments, several instances of a variable may be evaluated in parallel, using multiple logical processor threads, or the algorithm may be enhanced by incorporating branch prediction. Furthermore, it should be noted that the processes of FIGS. 12-18 may be implemented on a combination of suitably configured software and hardware, and that any of the devices or equipment discussed in relation to FIGS. 1-11 could be used to implement one or more portions of the various processes.

The processes discussed above are intended to be illustrative and not limiting. One skilled in the art would appreciate that the parts of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flow diagrams or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
generating for display a super-interface comprising a plurality of concentric circular interfaces, wherein:
a first circular interface of the plurality of concentric circular interfaces comprises identifiers corresponding to a first plurality of content items available from a first content source;
a first sector of the first circular interface comprises one or more identifiers corresponding to content items of a first category;
a second circular interface of the plurality of concentric circular interfaces comprises identifiers corresponding to a second plurality of content items available from a second content source; and
a second sector of the second circular interface comprises one or more identifiers corresponding to content items of the first category;
based on receiving an input comprising swiping the first sector of the first circular interface, simultaneously scrolling identifiers corresponding to content items of the first category from the first sector and the second sector; and
based on receiving an input comprising rotating the first sector of the first circular interface, adjusting display of the first circular interface to switch categories of one or more sectors of the first circular interface.

2. The method of claim 1, further comprising combining the first and second sectors to define a third sector comprising the identifiers corresponding to content items of the first category from the first sector and the second sector.

3. The method of claim 2, further comprising:
removing a first identifier corresponding to a first content item of the first category that is moved outside the third sector based on scrolling the identifiers; and
adding a second identifier corresponding to a second content item of the first category in the third sector.

4. The method of claim 2, further comprising modifying the third sector to display the one or more identifiers corresponding to content items of the first category from the first sector and the second sector for simultaneous scrolling.

5. The method of claim 4, wherein the modifying the third sector comprises elongating the third sector along a direction based on the swiping the first sector of the first circular interface.

6. The method of claim 4, wherein the modifying the third sector comprises shuffling the one or more identifiers from the first sector with the one or more identifiers from the second sector.

7. The method of claim 2, wherein the combining the first and second sectors to define the third sector comprises rotating respective positions of the first sector in the first circular interface and the second sector in the second circular interface to have the first sector adjacent to the second sector.

8. The method of claim 1, wherein the adjusting the display of the first circular interface to switch categories of one or more sectors of the first circular interface comprises:
based on the input comprising rotating the first sector of the first circular interface, modifying the first sector to comprise one or more identifiers corresponding to content items of a second category different from the first category.

9. The method of claim 1, wherein the first circular interface is an inner circular interface of the plurality of concentric circular interfaces and the second circular interface is an outer circular interface of the plurality of concentric circular interfaces.

10. The method of claim 1, wherein the super-interface comprises a central interface, the method further comprising:
based on receiving a selection of an identifier at a circular interface of the plurality of concentric circular interfaces, generating for display the selected identifier in the central interface.

11. A system comprising:
display circuitry configured to display one or more interfaces; and
control circuitry configured to:
- generate, via the display circuitry, for display a super-interface comprising a plurality of concentric circular interfaces, wherein:
  - a first circular interface of the plurality of concentric circular interfaces comprises identifiers correspond to a first plurality of content items available from a first content source;
  - a first sector of the first circular interface comprises one or more identifiers correspond to content items of a first category;
  - a second circular interface of the plurality of concentric circular interfaces comprises identifiers correspond to a second plurality of content items available from a second content source; and
  - a second sector of the second circular interface comprises one or more identifiers correspond to content items of the first category;
- based on receiving an input comprising swiping the first sector of the first circular interface, simultaneously scroll identifiers corresponding to content items of the first category from the first sector and the second sector; and
- based on receiving an input comprising rotating the first sector of the first circular interface, adjust display of the first circular interface to switch categories of one or more sectors of the first circular interface.

12. The system of claim 11, wherein the control circuitry is further configured to combine the first and second sectors to define a third sector comprising the identifiers correspond to content items of the first category from the first sector and the second sector.

13. The system of claim 12, wherein the control circuitry is further configured to:
- remove a first identifier corresponding to a first content item of the first category that is moved outside the third sector based on scrolling the identifiers; and
- add a second identifier corresponding to a second content item of the first category in the third sector.

14. The system of claim 12, wherein the control circuitry is further configured to modify the third sector to display the one or more identifiers corresponding to content items of the first category from the first sector and the second sector for simultaneous scrolling.

15. The system of claim 14, wherein the control circuitry, when modifying the third sector, is configured to elongate the third sector along a direction based on the swiping the first sector of the first circular interface.

16. The system of claim 14, wherein the control circuitry, when modifying the third sector, is configured to shuffle the one or more identifiers from the first sector with the one or more identifiers from the second sector.

17. The system of claim 12, wherein the control circuitry, when combining the first and second sectors to define the third sector, is configured to rotate respective positions of the first sector in the first circular interface and the second sector in the second circular interface to have the first sector adjacent to the second sector.

18. The system of claim 11, wherein the control circuitry, when adjusting display of the first circular interface to switch categories of one or more sectors of the first circular interface, is configured to:
- based on the input comprising rotating the first sector of the first circular interface, modify the first sector to comprise one or more identifiers corresponding to content items of a second category different from the first category.

19. The system of claim 11, wherein the first circular interface is an inner circular interface of the plurality of concentric circular interfaces and the second circular interface is an outer circular interface of the plurality of concentric circular interfaces.

20. The system of claim 11, wherein the super-interface comprises a central interface, and wherein the control circuitry is further configured to:
- based on receiving a selection of an identifier at a circular interface of the plurality of concentric circular interfaces, generate for display the selected identifier in the central interface.

* * * * *